United States Patent
Klein et al.

(10) Patent No.: US 7,177,598 B2
(45) Date of Patent: Feb. 13, 2007

(54) METHOD AND SYSTEM FOR REDUCING CHANNEL INTERFERENCE IN A FRAME-SYNCHRONIZED WIRELESS COMMUNICATION SYSTEM

(75) Inventors: Israel Jay Klein, San Diego, CA (US); Sheldon L. Gilbert, San Diego, CA (US); Kenneth L. Stanwood, Cardiff by the Sea, CA (US); Jacques Behar, San Diego, CA (US); David Gazelle, San Diego, CA (US); Frederick W. Price, Carlsbad, CA (US)

(73) Assignee: Wi-LAN, Inc., Alberta (CA)

( * ) Notice: Subject to any disclaimer, the term of this patent is extended or adjusted under 35 U.S.C. 154(b) by 804 days.

(21) Appl. No.: 09/947,650

(22) Filed: Sep. 5, 2001

(65) Prior Publication Data

US 2002/0058513 A1 May 16, 2002

Related U.S. Application Data

(60) Provisional application No. 60/248,867, filed on Nov. 15, 2000, provisional application No. 60/249,769, filed on Nov. 16, 2000.

(51) Int. Cl.
*H04B 1/00* (2006.01)
(52) U.S. Cl. .................. 455/63.1; 455/63.2; 455/63.3; 455/63.4; 455/67.11; 455/423; 455/446; 455/447; 370/277; 370/281; 370/296; 370/328; 370/329; 370/330; 370/478
(58) Field of Classification Search .................. 455/63, 455/63.1, 63.2, 67.11, 423, 446, 447, 449; 370/277, 281, 296, 328, 329, 330, 337, 347, 370/436, 478
See application file for complete search history.

(56) References Cited

U.S. PATENT DOCUMENTS 3,949,404 A 4/1976 Fletcher et al.

(Continued)

FOREIGN PATENT DOCUMENTS

EP 0 429 200 A2 10/1990

(Continued)

OTHER PUBLICATIONS

Lin., et al., "*Error Control Coding, Fundamentals and Applications*", Prentice-Hall Computer Applications in Electrical Engineering Series., 1993, pp. 315-349.

(Continued)

*Primary Examiner*—Duc M. Nguyen
*Assistant Examiner*—Matthew Genack
(74) *Attorney, Agent, or Firm*—Procopio, Cory, Hargreaves & Savitch LLP

(57) ABSTRACT

Base stations having potentially interfering terminal stations that are geographically located on the same or similar diagonal or Line of Sight (relative to the base station) operate on a first set of time frames (e.g., "even" time frames). Similarly, base stations having potentially interfering terminal stations that are not geographically located on the same or similar diagonals operate on a second set of time frames (e.g., "odd" time frames). By alternating in their use of the even and odd frames, the potential for co-channel interference between terminal stations is minimized. Systems and methods are disclosed which reduce co-channel and adjacent channel interference between terminal stations of different cells as well as adjacent channel interference between terminal stations of adjacent cells. The methods and systems so described can be used during the deployment or expansion of a communication system in a region.

50 Claims, 14 Drawing Sheets

U.S. PATENT DOCUMENTS

| | | | |
|---|---|---|---|
| 4,495,619 A | | 1/1985 | Acampora |
| 5,130,983 A | | 7/1992 | Heffner, III |
| 5,297,144 A | | 3/1994 | Gilbert et al. |
| 5,420,851 A | | 5/1995 | Seshadri et al. |
| 5,444,698 A | | 8/1995 | Kito |
| 5,511,082 A | | 4/1996 | How et al. |
| 5,517,503 A | | 5/1996 | Hess |
| 5,603,083 A | * | 2/1997 | Lee ............................ 455/561 |
| 5,615,212 A | | 3/1997 | Ruszczyk et al. |
| 5,638,371 A | | 6/1997 | Raychaudhuri et al. |
| 5,638,374 A | | 6/1997 | Heath |
| 5,675,573 A | | 10/1997 | Karol et al. |
| 5,751,708 A | | 5/1998 | Eng et al. |
| 5,768,254 A | | 6/1998 | Papadopoulos et al. |
| 5,828,695 A | | 10/1998 | Webb |
| 5,859,619 A | | 1/1999 | Wu et al. |
| 5,890,055 A | | 3/1999 | Chu et al. |
| 5,901,358 A | * | 5/1999 | Petty et al. .............. 455/456.2 |
| 5,973,638 A | * | 10/1999 | Robbins et al. ............. 342/172 |
| 6,006,069 A | | 12/1999 | Langston |
| 6,016,311 A | | 1/2000 | Gilbert et al. |
| 6,016,313 A | | 1/2000 | Foster, Jr. et al. |
| 6,038,455 A | | 3/2000 | Gardner et al. |
| 6,069,885 A | * | 5/2000 | Fong et al. ................. 370/336 |
| 6,094,421 A | | 7/2000 | Scott |
| 6,112,080 A | | 8/2000 | Anderson et al. |
| 6,216,244 B1 | * | 4/2001 | Myers et al. ............... 714/746 |
| 6,577,869 B1 | * | 6/2003 | Garrison ..................... 455/447 |
| 6,603,826 B1 | * | 8/2003 | Cupo et al. ................. 375/346 |
| 6,707,798 B1 | * | 3/2004 | Klein et al. ................. 370/280 |
| 6,741,579 B1 | * | 5/2004 | Choi et al. .................. 455/447 |
| 6,748,021 B1 | * | 6/2004 | Daly ........................... 375/261 |
| 6,822,998 B1 | * | 11/2004 | Yun et al. ................... 375/130 |
| 2001/0006517 A1 | * | 7/2001 | Lin et al. .................... 370/348 |
| 2001/0046867 A1 | * | 11/2001 | Mizoguchi ................. 455/452 |

FOREIGN PATENT DOCUMENTS

| | | |
|---|---|---|
| EP | 0 507 384 A2 | 12/1992 |
| EP | 0 720 405 A2 | 7/1996 |
| EP | 0 891 060 A1 | 1/1998 |
| EP | 0 845 916 A2 | 6/1998 |
| WO | WO 92/22162 | 12/1992 |
| WO | WO 99/38343 | 7/1999 |
| WO | WO 99/39532 | 8/1999 |
| WO | WO 00/01188 | 1/2000 |
| WO | WO 01/76106 A2 | 3/2001 |

OTHER PUBLICATIONS

L.H. Charles Lee, "Convolutional Coding, Fundamentals and Applications", Artech House, Inc., 1997, p. 11-51.

Redl, et al., "An Introduction to GSM", Artech House, Inc., 1995: pp. 84, 85 and 95.

C.E. Shannon, "A Mathematical Theory of Communication", Bell System Technical Journal, pp. 379-423 (Part 1), 623-656 (Part II), Jul. 1948.

Ulm., et al., "Data-Over-Cable Interface Specifications, Radio Frequency Interface Specification", Hewlett Packard Interim Specification, Doc. Control No.: SP-RFII01-970321, published Mar. 21, 1997 by MCND Holdings, L.P., Section 6, pp. 43-65.

Wolf, et al., "On the Weight Distribution of Linear Block Codes Formed From Convolutional Codes", IEEE, IEEE Transactions on Communications, vol. 44;9, Sep. 1996.

"Asynchronous Transfer Mode (ATM) Technical Overview", 2nd Edition, Prentice Hall, Oct. 1995, Chapter 3, pp. 21-25.

Sampei, S. et al., Adaptive Modulation/TDMA Scheme for Personal Multi-Media Communication Systems, (Nov. 28, 1994) Telecommunications Conference (Globecom), IEEE, pp. 989-993.

Ue, Toyoki et al., Symbol Rate and Modulation Level Controlled Adaptive Modulation/TDMA/TDD for Personal Communication Systems, (Jul. 25, 1995) Proceedings of the Vehicular Technology Conference, IEEE, vol. Conf. 45 pp. 306-310.

* cited by examiner

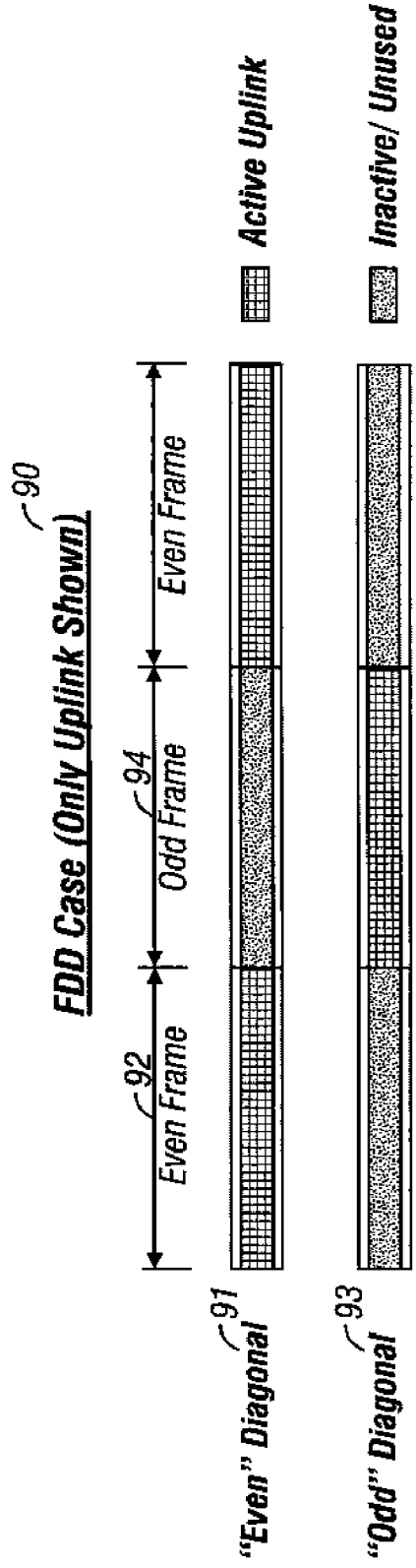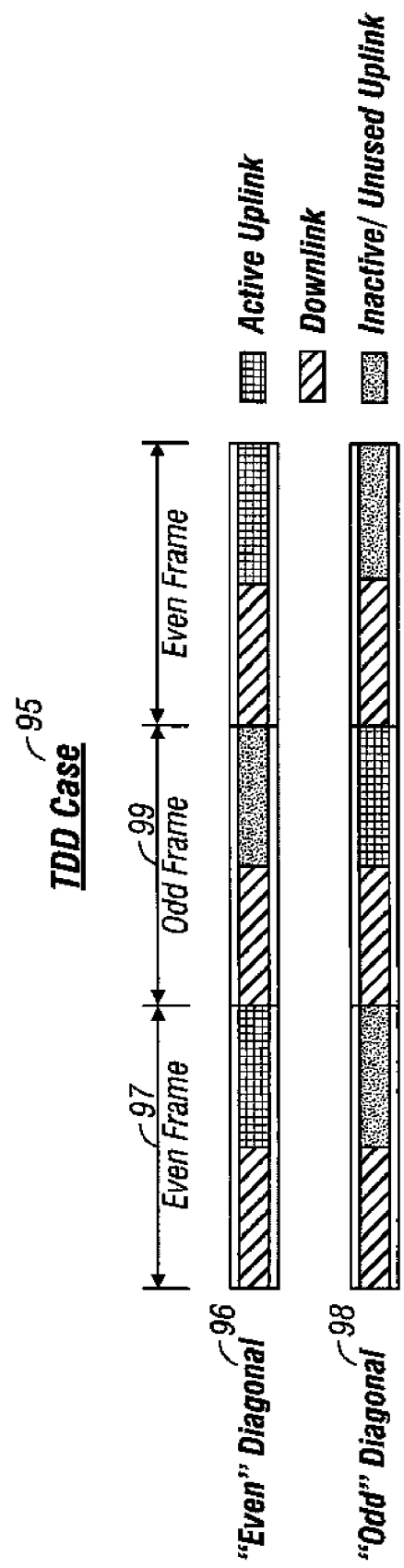
Figure 9a
Figure 9b

METHOD AND SYSTEM FOR REDUCING CHANNEL INTERFERENCE IN A FRAME-SYNCHRONIZED WIRELESS COMMUNICATION SYSTEM

RELATED APPLICATIONS

This application claims priority to provisional application Ser. No. 60/248,867, filed Nov. 15, 2000, titled "METHOD AND APPARATUS FOR REDUCING CO-CHANNEL INTERFERENCE IN A FRAME-SYNCHRONIZED WIRELESS COMMUNICATION SYSTEM" and 60/249,769, filed Nov. 16, 2000, titled "METHOD AND APPARATUS FOR REDUCING CO-CHANNEL INTERFERENCE IN A FRAME-SYNCHRONIZED WIRELESS COMMUNICATION SYSTEM," both of which are hereby incorporated by reference.

BACKGROUND OF THE INVENTION

1. Field of the Invention

This invention relates to communication systems and to a method and system for reducing channel interference in a wireless communication system.

2. Description of Related Art

A wireless communication system facilitates two-way communication between a plurality of subscriber radio stations or subscriber units (either fixed or portable) and a fixed network infrastructure. Exemplary systems include mobile cellular telephone systems, personal communication systems (PCS), and cordless telephones. The objective of these wireless communication systems is to provide communication channels on demand between the subscriber units and the base station in order to connect the subscriber unit user with the fixed network infrastructure (usually a wired-line system). In the wireless systems using multiple access schemes, frames of time are the basic transmission unit. Each frame is divided into a plurality of slots of time. Some time slots are used for control purposes and some time slots are used for information transfer. Information is typically transmitted during time slots in the frame where the time slots are assigned to a specific subscriber unit. Subscriber units typically communicate with the base station using a "duplexing" scheme that allows for the exchange of information in both directions of connection.

Transmissions from the base station to the subscriber unit are commonly referred to as "downlink" transmissions. Transmissions from the subscriber unit to the base station are commonly referred to as "uplink" transmissions. Depending upon the design criteria of a given system, the prior art wireless communication systems have typically used either time division duplexing (TDD) or frequency division duplexing (FDD) methods to facilitate the exchange of information between the base station and the subscriber units. Both the TDD and FDD duplexing schemes are well known in the art. Exemplary wireless communication systems using these schemes are described in more detail in the related U.S. Pat. No. 6,038,455, by Gardner et al., issued Mar. 14, 2000, entitled "Reverse Channel Reuse Scheme in a Time Shared Cellular Communication System", which is herein incorporated by reference.

Some communication systems do not use time frames in communicating between the base station and their respective and associated subscriber units (or "terminal stations" in Broadband Wireless Access (BWA) communication systems). For example, BWA systems based on cable modem technologies do not use time frames when communicating on either the uplink or the downlink. Therefore, these systems do not allow for frame synchronization between base stations and disadvantageously do not permit coordination between the base stations for purposes of reducing co-channel interference. Similarly, un-synchronized TDD systems allow different communication cells within the system to be "free running", in that different cells and sectors within the system operate on frames that are not synchronized in time.

Wireless communication systems rely upon frequency re-use because frequency allocation or bandwidth is typically limited. For example, in cellular communication systems and broadband wireless systems, geographic areas or regions are typically divided into cells that are nominally hexagonally or square shaped. As described in U.S. Pat. No. 6,038,455, each cell or sector is allocated one or more radio frequency channels. For example, in a cellular communication system utilizing frequency division multiple access (FDMA), adjacent or nearby cells are assigned separate frequencies. After all available frequencies have been allocated, it is necessary to begin reusing the frequencies. For example, if four frequencies are available, it is necessary to begin using the first frequency again starting in the fifth cell. Due to the nature of the systems described in the incorporated U.S. Pat. No. 6,038,455, and in PCS, cellular and paging systems of the prior art, frequency re-use cannot be used as aggressively as it can be used in BWA systems. For example, in PCS/cellular/paging systems, typically only a fraction of the frequency spectrum is used per cell. In contrast, in BWA, frequency re-use can be much more aggressive (for example, a frequency can be re-used at least once per cell, with multiple sectors).

Since base stations often operate on the same radio frequency (RF) channel or adjacent RF channels and transmit in the same general direction, terminal stations within adjacent sectors can receive unwanted RF energy from base stations. Similarly, the base station can receive unwanted RF energy from terminal stations. Receiving unwanted RF energy causes channel interference in the form of co-channel interference or adjacent channel interference. Therefore, a need exists for a method and system for reducing channel interference in a wireless communication system. By implementing such a method, the wireless communication system's capacity should increase. Furthermore, this channel interference reducing system and method can utilize uplink and downlink bandwidth in an allocation-efficient manner.

SUMMARY OF THE INVENTION

The present invention is directed to systems and methods for reducing channel interference in a wireless communication system.

Channel interference in wireless communication systems that are coordinated and/or synchronized, such as a frame-synchronized broadband wireless communication system, can be reduced at selected base stations by transmitting uplink data from the selected base stations at selected times or frames while transmitting uplink data from other base stations at different selected times or frames. The embodiments described herein can be used with systems that have a framing structure on the downlink and uplink, or alternatively only on the uplink, as do time division duplex ("TDD") or half-duplex frequency division duplexing ("FDD") systems. A "frame synchronized" system is one in which base stations use frame based communications, and wherein all of the frames are synchronized to one another in the time domain. The embodiments described herein can be used with communication systems to reduce channel interference due to co-channel interference and adjacent channel interference.

One aspect includes co-channel interference reducing systems and methods that utilize sub-channels of the uplink channels to reduce co-channel interference. Another aspect includes a method and system for reducing co-channel interference in a frame-based and frame-synchronized broadband wireless communication system by using even and odd frames. Such a system can reduce co-channel interference from selected terminal stations by transmitting uplink data from the selected terminal stations at pre-selected time frames while transmitting uplink data from other terminal stations at different pre-selected time frames. The systems and methods described herein improve performance and capacity in both FDD and TDD applications.

Another aspect includes a method and system for reducing channel interference in a communication system that includes base stations and terminal stations with each terminal station associated with a base station, and each base station being associated with a cell. The method comprises determining a first set of terminal stations in a first cell that may potentially interfere with a second set of terminal stations in a second cell, determining a first subset of the first set of terminal stations that lie along a geographic diagonal line passing through a base station in the second cell, and determining a second subset of the second set of terminal stations that uplink using a less robust modulation technique. The method further includes selecting a more robust modulation technique for the second subset of the second set of terminal stations and coordinating uplink transmissions by the first subset of the first set of terminal stations with uplink transmissions by the second subset of the second set of terminal stations, the second subset of the second set of terminal stations utilizing the more robust modulation technique to reduce channel interference at the base station in the second cell. Additional embodiments coordinate the uplink transmissions from the first and second terminal stations to minimize channel interference. Further embodiments vary forward error correction (FEC) techniques to minimize channel interference.

Another aspect includes a method and system for reducing adjacent channel interference in a communication system that includes a base station and terminal stations with each base station having antenna arrays, and each terminal station associated with one antenna array for transmitting an uplink to the base station. The method comprises determining a first set of terminal stations that may potentially interfere with a second set of terminal stations, the second set of terminal stations being associated with a first antenna array of a base station, determining a second subset of the second set of terminal stations that uplink to the first antenna array using a less robust modulation technique, and selecting a more robust modulation technique for the second subset of the second set of terminal stations. The method further includes coordinating uplink transmissions by the first set of terminal stations with uplink transmissions by the second subset of the second set of terminal stations, the second subset of the second set of terminal stations utilizing the more robust modulation technique to reduce adjacent channel interference at the first antenna array. Additional embodiments coordinate the uplink transmissions from the first and second terminal stations to minimize channel interference. Further embodiments vary forward error correction (FEC) techniques to minimize channel interference.

BRIEF DESCRIPTION OF THE DRAWINGS

FIG. 9a is an exemplary time frame map used in the frame-synchronized systems of FIGS. 3c, 6 and 7, showing the time frame map in the uplink of an FDD system.

FIG. 9b is an exemplary time frame map used in the frame-synchronized systems of FIGS. 3c, 6 and 7, showing the time frame map in the uplink and downlink of a TDD system.

Like reference numbers and designations in the various drawings indicate like elements.

DETAILED DESCRIPTION OF THE INVENTION

Throughout this description, the embodiments and examples shown should be considered as exemplars, rather than as limitations.

An exemplary broadband wireless communication system for use with the embodiments described herein is described in the related U.S. Pat. No. 6,016,311, by Gilbert et al., issued Jan. 18, 2000, entitled "Adaptive Time Division Duplexing Method and System for Dynamic Bandwidth Allocation within a Wireless Communication System", which is hereby incorporated by reference. The communication system described in U.S. Pat. No. 6,016,311 is an adaptive time division duplexing (ATDD) method and system for duplexing transmissions in wireless communication systems. The ATDD system adapts to the uplink and downlink bandwidth requirements of the channels.

Figure 1A:
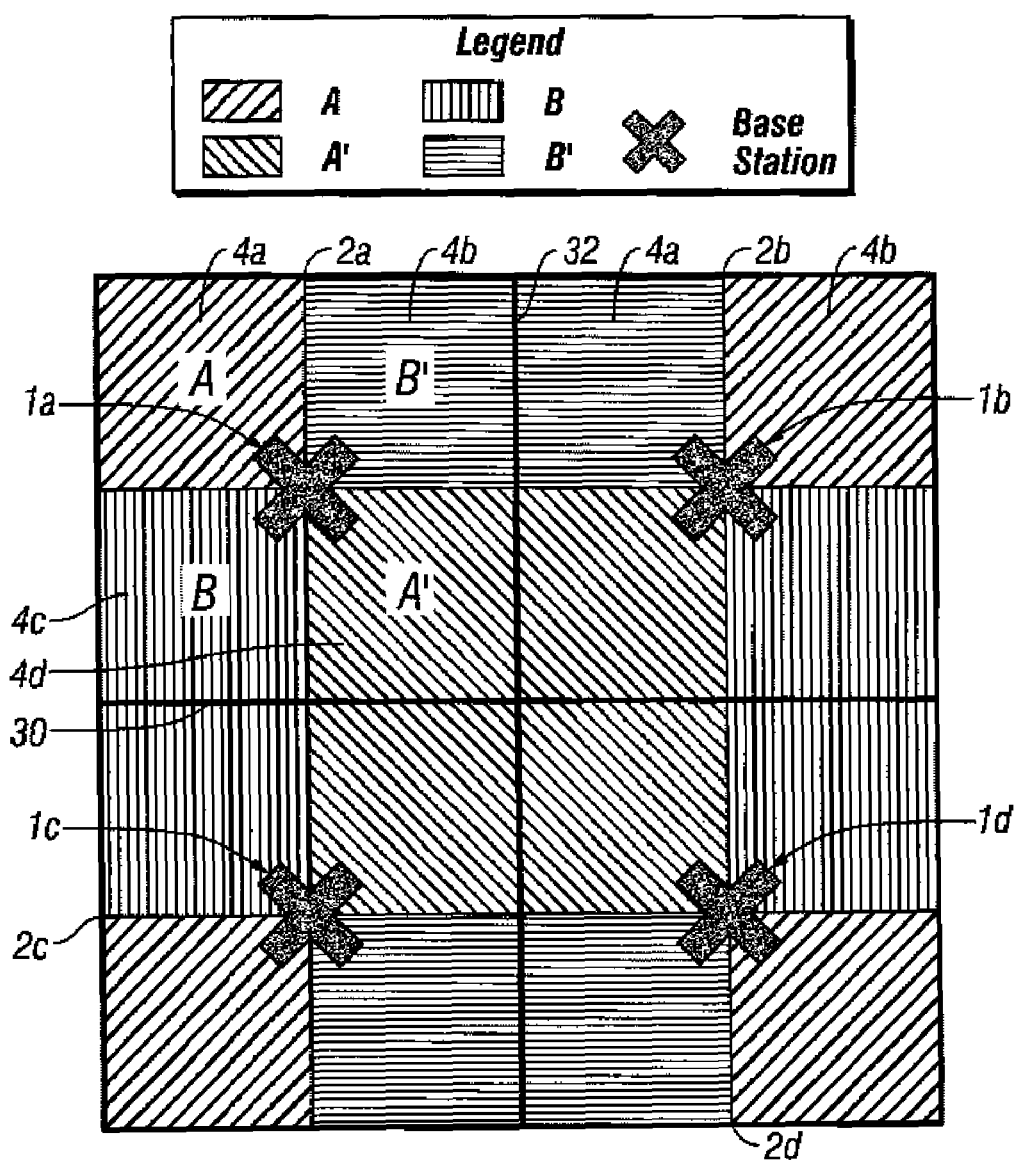
FIG. 1a is a diagram of a broadband wireless configuration incorporating frequency re-use where a plurality of base stations 1(a)–(d) communicate with fixed terminal stations (i.e., "subscriber units").

FIG. 1a is a diagram of a wireless communication system configuration incorporating frequency re-use where a plurality of base stations $1(a)$–$(d)$ communicate with fixed terminal stations (i.e., "subscriber units"). Clusters of four sectors $4(a)$–$(d)$ surround each base station $1(a)$–$(d)$ to form cells $2(a)$–$(d)$. The cells are shown separated by bold lines 30 and 32. Each cell $2(a)$–$(d)$ includes four sectors $4(a)$–$(d)$ to form a coverage area that is square. In one embodiment, each cell 2 includes six sectors to form a hexagonal coverage area.

Each cell $2(a)$–$(d)$ includes a base station $1(a)$–$(d)$. For example, cell $2(a)$ includes base station $1(a)$. Cell $2(b)$ includes base station $1(b)$. Each base station typically includes an array of sectored antennas (not shown) for communicating with the terminal stations within its cell. A sectored antenna is often 60 or 90 degrees in beamwidth for communicating with terminal stations within an entire sector. Thus, in a four-sector case, a base station $1(a)$ comprises at least four sectored antennas, with at least one antenna per sector $4(a)$, $4(b)$, $4(c)$, $4(d)$. In a six-sector case, the base station comprises six sectored antennas.

Each sector contains a plurality of terminal stations that communicate with the base station $1(a)$ on a radio frequency (RF) channel. Each terminal station utilizes a highly directional antenna for communicating with its associated base station. The directional antenna is fixed and pointed towards the associated base station. On the downlink, a base station's sectored antenna transmits energy on an RF channel to a terminal station's highly directional antenna. On the uplink, a terminal station's highly directional antenna transmits energy on the RF channel to a base station's sectored antenna. The uplink can be less spectrum efficient than the downlink. The uplink spectrum efficiency can suffer because the base station collects RF energy using a sector antenna having a much greater beamwidth while the terminal stations collect energy using a highly directional antenna. This allows the downlink to support less robust modulation schemes (e.g., quadrature amplitude modulation-64 and quadrature amplitude modulation-16) while the uplink may require more robust modulation schemes (e.g., quadrature phase shift keying).

In accordance with frequency re-use methodologies and techniques, a set of RF channels is allocated for use in each cell $2(a)$–$(d)$. As shown in FIG. $1(a)$, each cell utilizes a set of four orthogonal RF channels (A, A', B, and B') comprising two frequencies (or frequencies bands) (A and B) wherein each frequency has two different polarizations (designated by the "non-primed" and "primed" indicators). For example, the two different polarizations can be horizontal and vertical. Each sector $4(a)$–$(d)$ of each cell $2(a)$–$(d)$ therefore utilizes a different orthogonal RF channel for communication between terminals in its sector and an associated base station. For example, a terminal in sector $4(a)$ uses channel A, a terminal in sector $4(b)$ uses channel B', a terminal in sector $4(c)$ uses channel B, and a terminal in sector $4(d)$ uses channel A'. This set of four orthogonal RF channels is then reused as shown in FIG. $1(a)$ in adjacent cells $2(b)$–$(d)$. In each cell $2(a)$–$(d)$ the pattern of channel distribution is normally a mirror image of the channel distribution in adjacent and diagonal cells. Thus, the upper left-hand sector $4(a)$ of the upper left-hand cell $2(a)$ uses the same channel (e.g., channel A) as the upper right-hand sector $4(b)$ of the adjacent cell $2(b)$. Furthermore, the same channel is also used in the lower right-hand sector $4(d)$ of cell $2(d)$, and the lower left-hand sector $4(c)$ of cell $2(c)$.

Because channels are re-used, two cells or sectors operating on the same usable channel, though separated geographically, may interfere with each other. This is known as "co-channel interference". The effect of co-channel interference varies with terrain and distance. In cases where path loss conditions favor the desired signal, the co-channel interference may not be strong enough to have a significant impact on receiver performance. In other cases, path loss conditions may cause the difference between the desired carrier power and the interference (known as the "C/I" ratio) to be insufficient for good receiver performance. Co-channel interference is inversely proportional to a wireless communication system's capacity (i.e., ability to communicate with multiple terminal stations). Thus, as co-channel interference increases system capacity decreases. Well-known modulation schemes such as quadrature amplitude modulation (QAM) and quadrature phase shift keying (QPSK) are utilized in broadband wireless communications for efficiently transmitting data between terminal stations and base stations. When the C/I ratio is low (i.e., relatively high co-channel interference) a robust modulation scheme must be used. For example, QPSK is a robust modulation scheme that can operate at lower C/I ratios than QAM-16.

Figure 1B:
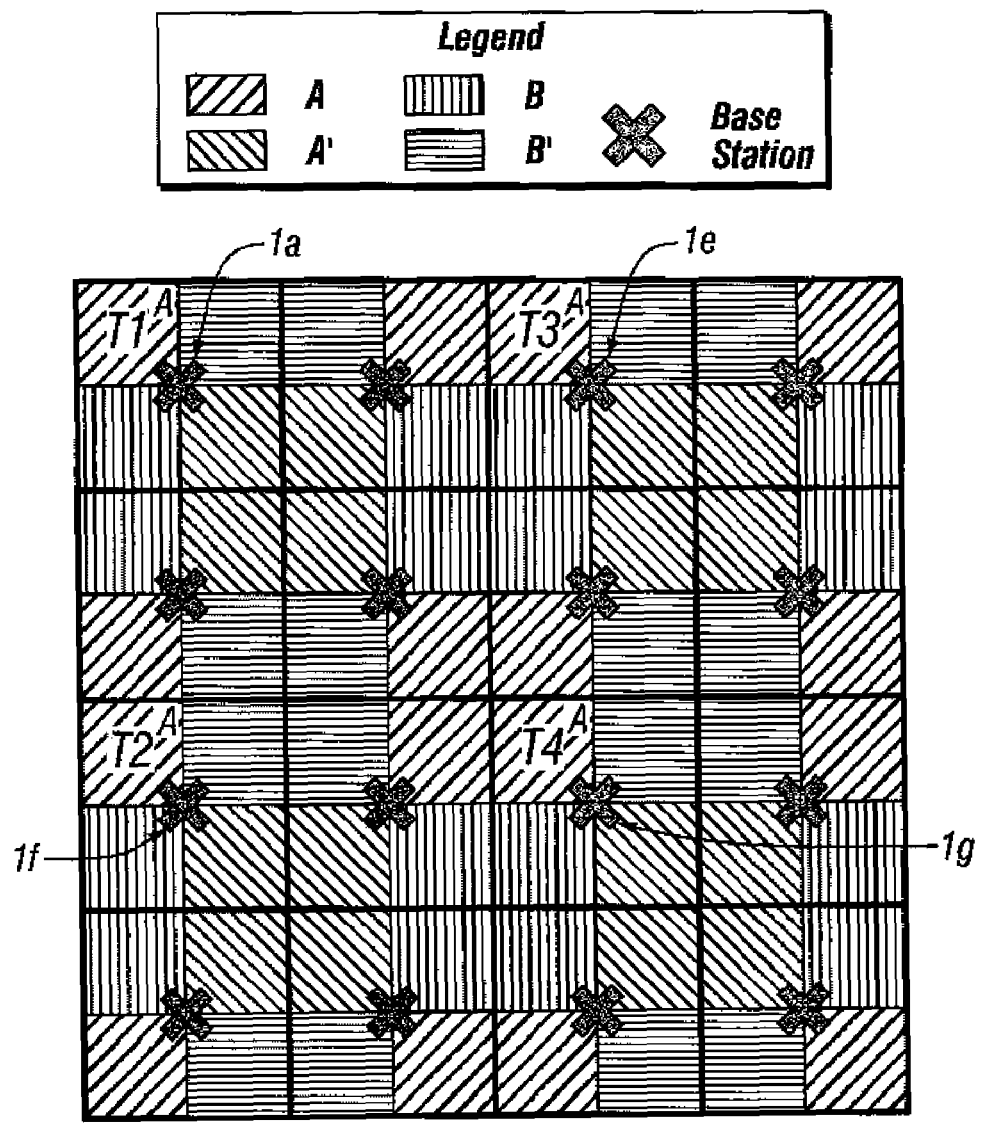
FIG. 1b shows a wireless communication system using a frequency re-use configuration that illustrates the potential problems associated with co-channel interference.

FIG. 1b shows a wireless communication system using a frequency re-use configuration that illustrates the potential problems associated with co-channel interference. Terminal stations located within sectors T1–T4 operate on the same RF channel, A. Similarly, base stations $1(a)$, $1(e)$, $1(f)$, $1(g)$ operate on the same RF channel, A, in sectors T1–T4. Since base stations $1(a)$, $1(e)$, $1(f)$, $1(g)$ operate on the same RF channel and transmit in the same general direction, the terminal stations within sector T1 can receive unwanted RF energy from base stations $1(e)$, $1(f)$, $1(g)$. Similarly, base station $1(g)$ can receive unwanted RF energy from terminal stations located within sectors T1–T3. Receiving unwanted RF energy causes co-channel interference.

Figure 2:
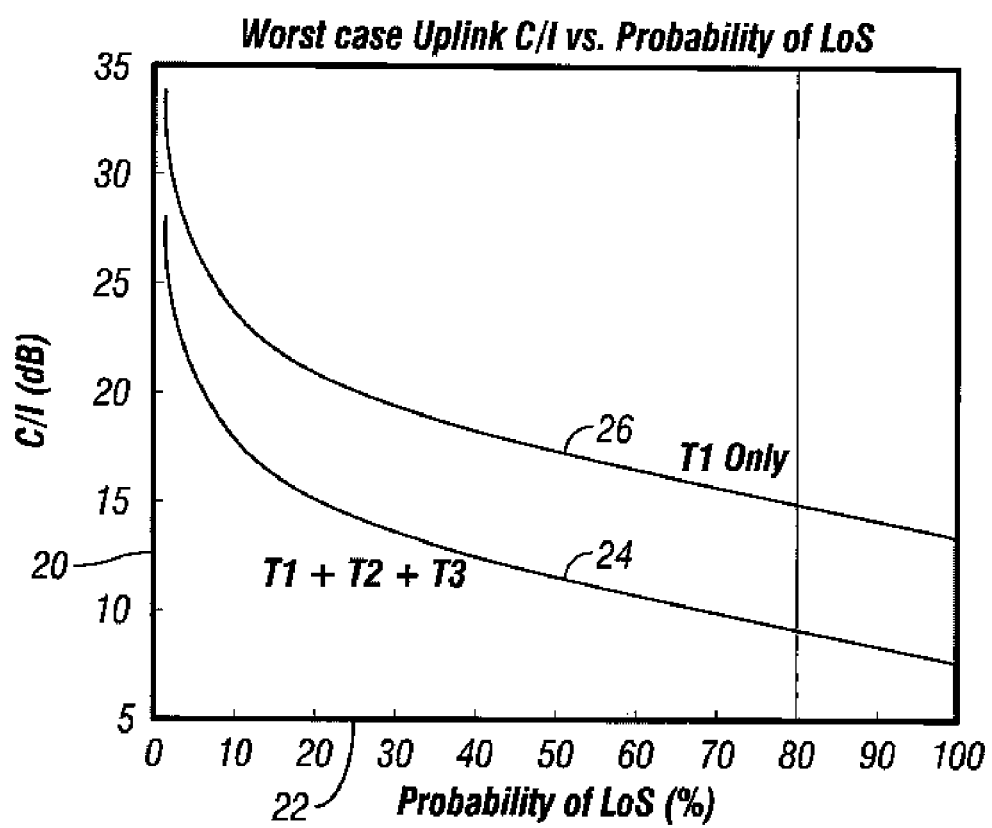
FIG. 2 is a graph of uplink C/I ratios for transmissions by terminal stations in sectors T1–T4 towards base station 1(g) of FIG. 1b.

FIG. 2 is a graph of uplink C/I ratios for transmissions by terminal stations in sectors T1–T4 towards base station $1(g)$ of FIG. 1b. The uplink C/I ratio is graphed versus the probability that incoming RF energy along the base station's $1(g)$ LoS interferes with the uplink transmissions from terminal stations in sector T4. Only sectors in nearby cells are considered in this analysis because the LoS conditions and propagation characteristics change dramatically for distant cells. A vertical axis 20 represents the C/I ratio measured in dB. A horizontal axis 22 represents the probability (measured as a percentage) of a terminal station located outside of sector T4 having a LoS position relative to the receiving base station $1(g)$. A plot line labeled "T1+T2+T3" 24 represents potentially interfering terminal stations from sectors T1–T3 interfering with the uplink transmissions by terminal stations in sector T4. A plot line labeled "T1 only" 26 represents potentially interfering terminal stations from only sector T1. Co-channel interference is greatest (i.e., worst case scenario occurs) when the probability of LoS is 100 percent. Thus, the C/I ratio reaches its smallest value (i.e., co-channel interference is at its greatest) when the probability of LoS is 100%.

Referring to the T1+T2+T3 plot line 24, when the probability of LoS of all potential interfering terminal stations located within sectors T1, T2 and T3 is greater than 50%, the C/I falls below 11 dB. Thus, the communication system's capacity is greatly reduced because not even a robust modulation scheme (i.e., QPSK) can operate when the C/I falls below 11 dB. Referring to the "T1 only" plot line 26, when the probability of LoS of all potential interfering terminal stations located within sector T1 is 100%, the C/I remains above 14 dB. Thus, the communication system's capacity is not as greatly affected as in the previous scenario because the most robust modulation scheme (i.e., QPSK) can operate when the C/I remains above 11 dB. However, at 100% LoS conditions, the more robust scheme is required. This increases the costs associated with deployment of the system and reduces the system's efficiency. Therefore, reducing co-channel interference from remote sectors that fall along a base station's LoS may increase the system's capacity.

To increase the number of available channels for implementing a frequency re-use plan, a channel can be separated into multiple bands of frequencies. Thus, an uplink channel, a downlink channel or both can be divided into sub-channels in order implement a frequency reuse pattern based in the frequency domain. Though the following example focuses upon dividing the uplink channel into two sub-channels, the method can also be applied to a downlink channel. Furthermore, the link can be divided into more than two sub-channels, for example, 3, 4, 5, 6, or more sub-channels.

Figure 3A:
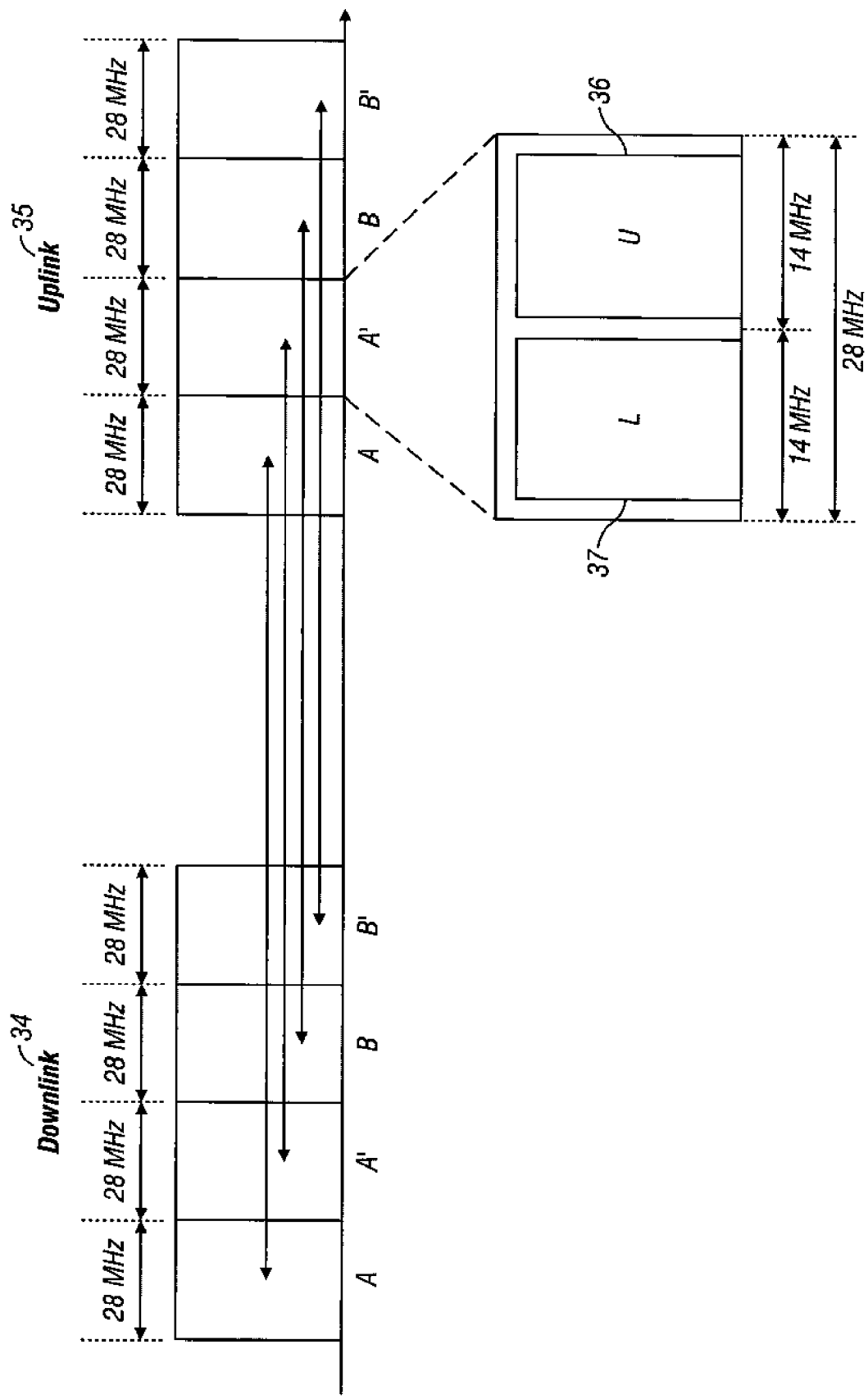
FIG. 3a is a representation of uplink and downlink channels when the uplink channel is subdivided into sub-channels.

FIG. 3a represents four orthogonal RF channels A, A', B, and B' comprising two frequencies, or frequency bands (A and B), wherein each frequency has two different polarizations (designated by the "non-primed" and "primed" indicators). In one example, each channel spans 28 MHz. In FIG. 3a the channels are used in the uplink 35 and downlink 34 of a TDD system. The uplink channel A' is further shown to be sub-divided into two 14 MHz sub-channels designated an upper sub-channel ("U") 36 and a lower sub-channel ("L") 37. Depending on the frequency re-use plan, each of the uplink channels 35 can be so sub-divided as can the downlink channels 34. In addition, different channel bands and different subdivisions of those bands can be used including non-symmetric subdivisions.

For example, if each of the uplink channels is sub-divided into two sub-channels, there are eight uplink sub-channels, an upper and a lower uplink sub-channel for each of A, A', B, and B'. For systems that use four sectors per cell, each sector of the cell can utilize one uplink sub-channel.

Figure 3B:
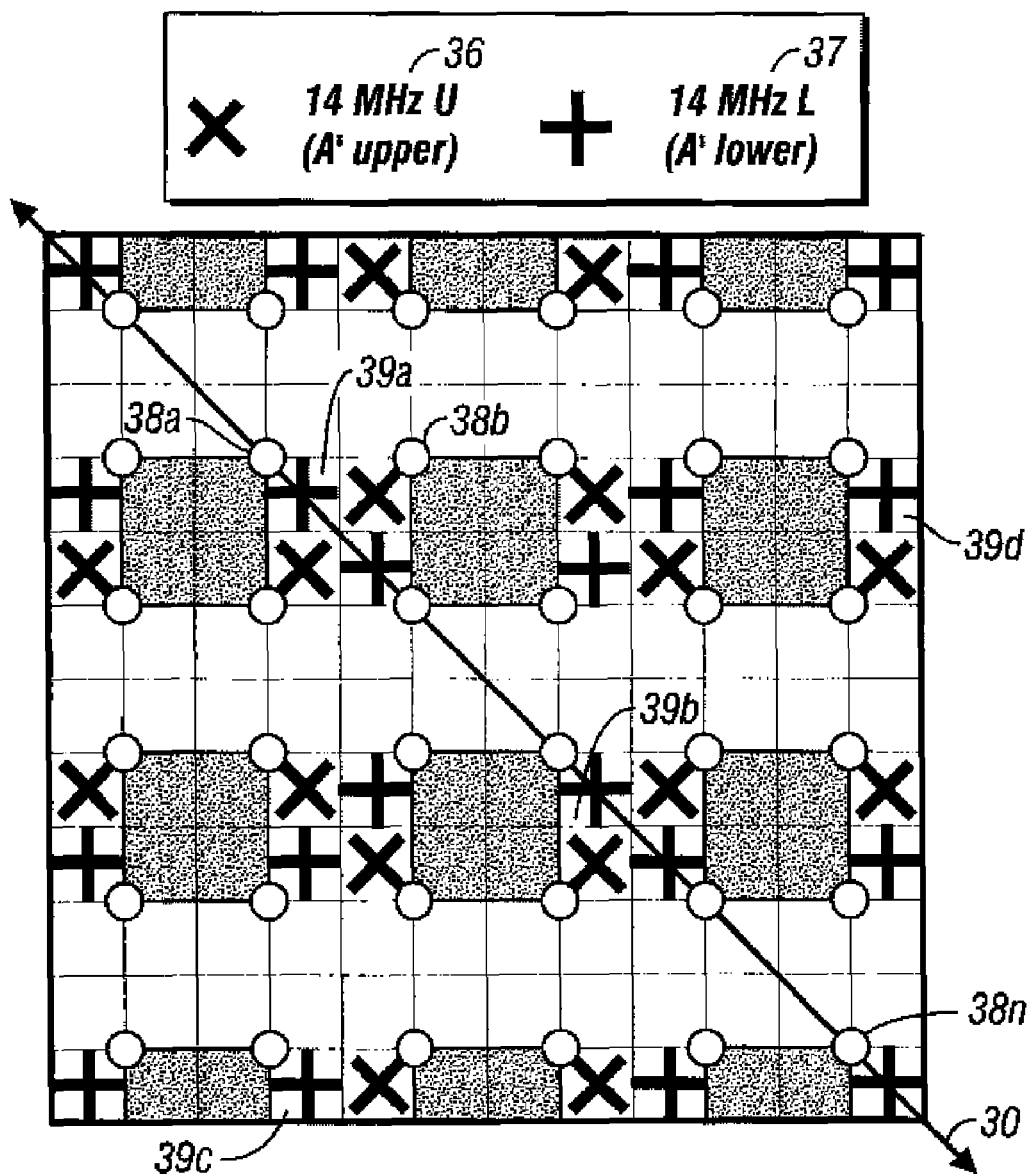
FIG. 3b is a simplified graphical representation of an exemplary broadband wireless frequency re-use configuration showing the allocation of sub-channels of a single uplink channel.

FIG. 3b shows a plurality of base stations 38(a)–(n) and their associated sectors. For ease of description, we now focus on an example of the assignment of uplink sub-channels that may potentially interfere, limiting our discussion to the sub-channels of uplink channel A' 36, 37. Sectors which are assigned to the lower sub-channel A' are marked with "+" and sectors which are assigned to the upper sub-channel A' are marked with "X". The same principles apply to each of the sub-channels of each of channel.

A base station sector which is assigned to receive the lower sub-channel A' ("+") may pick-up unwanted radio frequency energy (co-channel interference) from other sectors that are assigned to the same sub-channel and are transmitting generally in its direction along a LoS. However, the base station would not pick up interference from sectors along a LoS, which are using the upper sub-channel ("X"). For example, base station 38(a) utilizes the lower sub-channel in a sector 39(a). The nearest sector transmitting generally in its direction and using the same sub-channel on diagonal 30 is sector 39(b).

When the use of sub-channels is compared to a case where no sub-channels are used, for example, FIG. 1b, more or stronger potential co-channel interference exists in the scheme of FIG. 1b. In the non sub-channel system of FIG. 1b, first level sources of co-channel interference are located at a distance of 5 times the radius of a cell (T1 to T4) and also at a distance of 5R/sqrt(2) (T2 and T3 to T4), both from T4. In the sub-channel system depicted in FIG. 3b, first level sources of co-channel interference are located at a distance 9R/sqrt(2) (sectors 39(c) and 39(d) to sector 39(a)) and at 5R (sector 39(b) to sector 39(a)). When all of these sources of co-channel interference are active, the use of sub-channels can improve the expected C/I ratio as compared to the non sub-channel system.

Figure 3C:
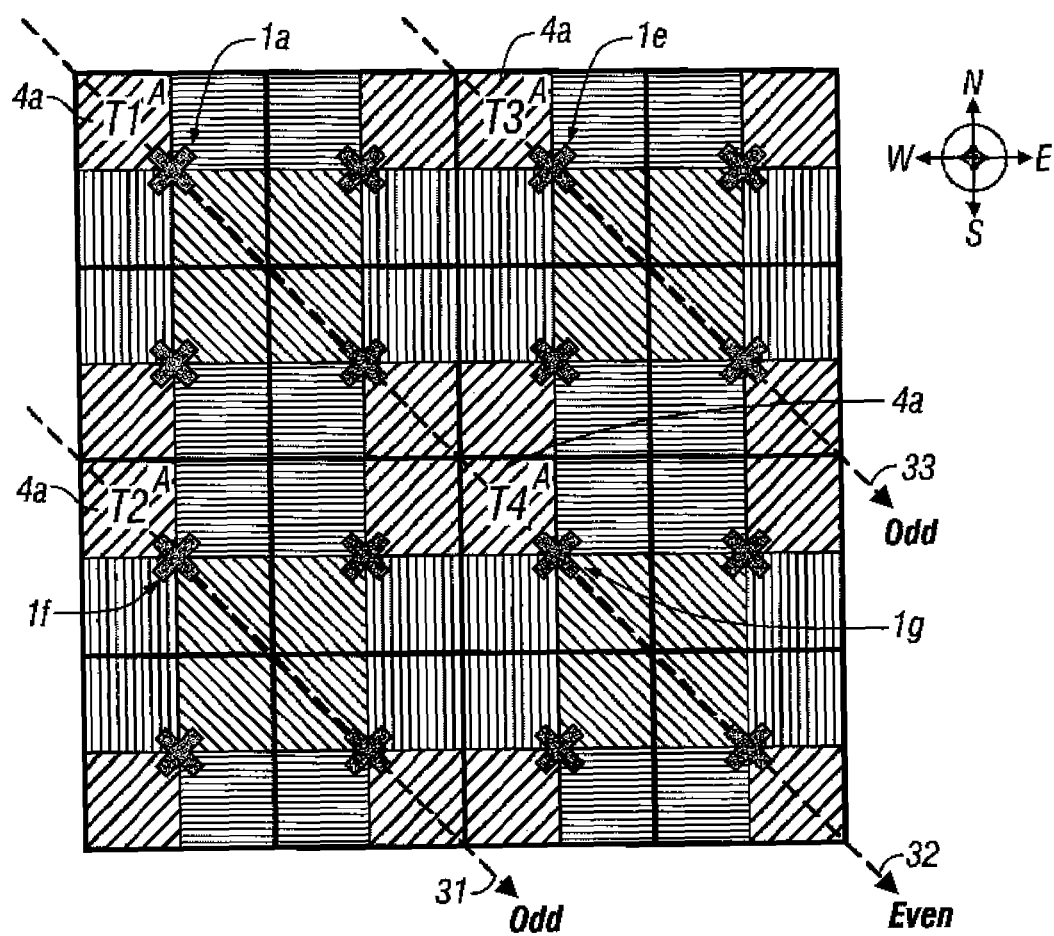
FIG. 3c is a representation of the system of FIG. 1b utilizing an even-odd frame frequency re-use scheme.

FIG. 3c is a representation of a system like that of FIG. 1b but utilizing an uplink time-frame allocation scheme to minimize co-channel interference. In determining the potential for co-channel interference occurring in the system, various system level factors can be evaluated. For example, base stations that operate on the same frequency, have the same polarization, and have sectored antennas facing the same direction, for example, relative to absolute north, have the potential for co-channel interference. The system minimizes co-channel interference between parallel subsets of base stations. For ease of description, FIG. 3c shows these subsets along a diagonal to the page. However, the invention is not so limited and can be implemented along any LoS between two base stations. When communicating with terminals located in sectors 4a, base stations 1(a), 1(e), 1(f) and 1(g) operate on the same frequency (frequency A), have the same polarization and have sectored antennas facing the same direction (northwest). The base station 1(a) is geographically located on the same diagonal ray 32 as the base station 1(g). Base station 1(e) is located on a diagonal ray 33, and base station 1(f) is located on a diagonal ray 31. Thus, the sectors 4a associated with the base stations 1(a), 1(e) and 1(f) have terminal stations that can potentially interfere with the base station 1(g) when communicating on the uplink.

In this example, to reduce co-channel interference, the base stations of interest are synchronized and base stations 1(a) and 1(g) operate on a first set of time frames in the uplink. For example, base stations 1(a) and 1(g) only operate on even time frames in the uplink. Base stations 1(e) and 1(f) are not geographically located on the same diagonal ray 32 relative to the base station 1(g). Base stations 1(e) and 1(f) can operate on a second set of time frames in the uplink. For example, base stations 1(e) and 1(f) operate on odd time frames in the uplink. Therefore, co-channel interference relative to the base station 1(g) is reduced from terminal stations in sectors T2 and T3 (the sectors 4a associated with the base stations 1(f) and 1(e), respectively).

Figure 4:
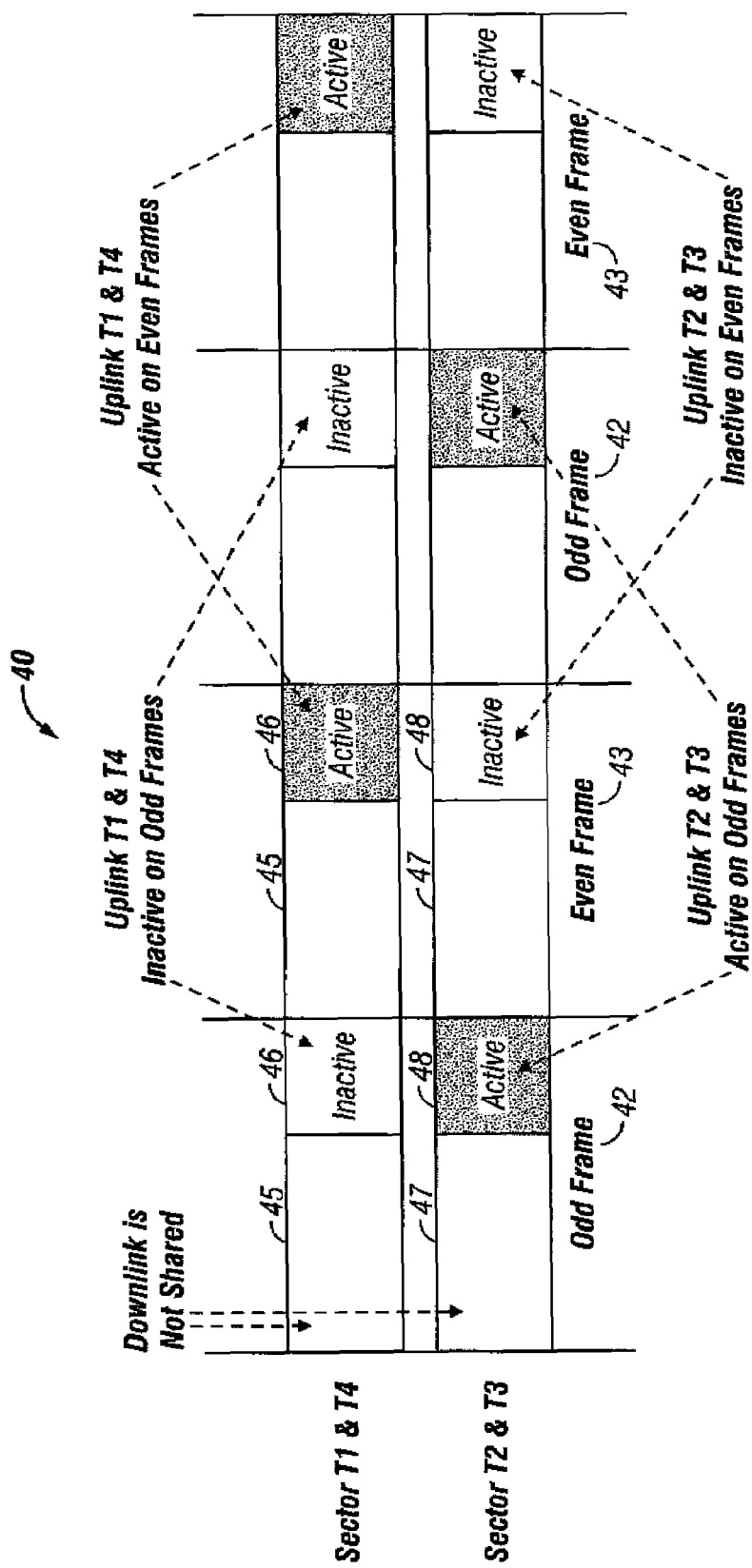
FIG. 4 is a time frame map illustrating the even-odd frequency re-use scheme described with reference to FIG. 3c.

FIG. 4 shows an exemplary time frame map 40 of the frequency reuse scheme described with reference to FIG. 3c. Terminal stations in sector T1 and T4 communicate with base stations 1(a), 1(g), respectively, using odd time frames 42 and even time frames 43 on channel A. Terminal stations in sector T2 and T3 communicate with base stations 1(f), 1(e), respectively, using the odd time frames 42 and the even time frames 43 also on channel A. For sector T1 and T4, channel A includes a downlink portion 45 and an uplink portion 46. For sector T2 and T3, channel A includes a downlink portion 47 and an uplink portion 48. Terminal stations located within sectors T1 and T4 operate on the uplink 46 (i.e., are active) only during even time frames 43. Terminal stations located within sectors T2 and T3 do not operate on the uplink 48 (i.e., are inactive) during even time frames 43. Therefore, the terminal stations in the sectors T2 and T3 do not contribute to C/I on the uplink 46 during the even time frames 43. Referring to FIG. 3c, during even time frames, only terminal stations in sector T1 can contribute to the C/I realized by base station 1(g) in the uplink direction.

Referring back to FIG. 4, the terminal stations located within sectors T2 and T3 operate on the uplink 48 (i.e., are active) only during odd time frames 42. Terminal stations located within sectors T1 and T4 do not operate on the uplink 46 (i.e., are inactive) during the odd time frames 42. Therefore, the terminal stations in the sectors T1 and T4 do not contribute to C/I on the uplink 48 during the odd time frames 42. Different time frame allocation schemes can be used with the embodiments herein. For example, terminal stations within sectors T1 & T4 can operate on the uplink every third frame. In this scheme, the terminal stations within the sectors T2 and T3 would be inactive on the uplink during the time frames that T1 and T4 were active on the uplink. Additionally, the ratio between the uplink and the downlink can be varied.

Systems typically have different co-channel interference and thus different spectrum efficiencies on the uplink as compared with the downlink due to differences between the sectored antenna used by the base stations and the narrow beamwidth antenna used by the terminal stations. In one embodiment, a variable ratio for uplink/downlink communication time frames is used when co-channel interference dictates different spectrum efficiencies for the uplink and the downlink. Spectrum efficiency is defined herein as the amount of information that can be transmitted in a communication system as measured in bits per second per Hertz (bps/Hz). Typically, spectrum efficiency is proportional to system capacity and inversely proportional to interference. Thus, as a system's interference decreases, the system's spectrum efficiency and capacity increases. Spectrum efficiency is impacted when different re-use schemes are used for the uplink and downlink.

One embodiment uses ATDD techniques (such as those described in U.S. Pat. No. 6,016,311) to compensate for differences between the uplink and downlink spectrum efficiencies. This embodiment adapts the portions of the uplink and downlink to compensate for the differing inefficiencies. For example, assume it is desired to have symmetric uplink and downlink net bandwidth (i.e., 50% of the bandwidth allocation is reserved for the uplink and 50% for the downlink). However, in minimizing co-channel interference, the downlink average spectrum efficiency is approximately 3 bits per second (bps) per Hz while the uplink average spectrum efficiency is approximately 1.5 bps/Hz. To compensate for the differences in spectrum efficiencies, the allocated bandwidth is changed. For example, each frame can be divided into uplink and downlink portions having a ratio of 3 to 1.5, or 2 to 1, meaning that approximately 67% of the frame is allocated for uplink transmissions and approximately 33% is allocated for downlink transmissions. Due to the spectrum inefficiencies given, the desired 50/50 net uplink/downlink bandwidth ratio results.

In a second example, a downlink/uplink bandwidth allocation ratio of 80% (4 to 1) is desired (80% of the net bandwidth allocated for the downlink and only 20% of the net bandwidth allocated for the uplink). Assuming the same downlink/uplink spectrum efficiencies described above (i.e., 3 bps/Hz on the downlink but only 1.5 bps/Hz on the uplink), an ATDD approach is used to change the uplink/downlink bandwidth allocation ratio to compensate for the spectrum efficiencies differences. The desired net bandwidth allocation of 80/20 is achieved by allocating 67% of the frame for downlink communications, 33% of the frame for uplink communications. Or, described in another manner, an 80/20 desired net bandwidth allocation (downlink/uplink) is a 4/1 ratio. By allocating 2/3 for the downlink, and 1/3 for the uplink, or (2/3*3(bps/Hz))/(1/3*3/2(bps/Hz))= 2/(1/2)=4/1 the desired net 4 to 1 bandwidth allocation ratio is achieved despite the differences between the uplink and the downlink efficiencies.

Now we turn to the more general case. When a specific net downlink/uplink ratio is desired in a time frame communication system, the fractional part of the time frame (or bandwidth) dedicated for the downlink (Rd) is calculated and the system adjusts the bandwidth allocation accordingly. Equation 1 is utilized to calculate Rd.

$$Rd=1/[(Sd/Su)/(Td/Tu)+1]; \qquad \text{Equation (1)}$$

where, Sd=spectrum efficiency for the downlink;
Su=spectrum efficiency for the uplink;
Td=time slots allocated by the system on the downlink;
Tu=time slots allocated by the system on the uplink.

The Td/Tu ratio can be monitored and adjusted by the communication system, for example by the base station. Thus, the time frame (the amount of bandwidth dedicated to the uplink and the downlink) can be adapted in the time domain accordingly. For example, an ATDD time frame method can allocate the downlink portion of a time frame according to the Rd value calculated utilizing Equation 1. The fractional part of the time frame dedicated to the uplink (Ru) is simply calculated from the Rd using the following formula: Ru=1−Rd.

When the uplink time frame allocation scheme described above (with reference to FIGS. 3c and 4) is utilized (e.g., odd/even time frame allocation), Equation 2 is used for calculating Rd:

$$Rd=1/[(Sd/Su)/(Td/Tu/2)+1] \qquad \text{Equation (2)}$$

Note that the time slots allocated by the system on the uplink, or Tu, is divided by a factor of "2" in Equation 2. As described above, the uplink typically experiences greater co-channel interference than does the downlink. Consequently, there is less re-use of frequencies on the uplink than there is on the downlink. The uplink is penalized by the RF planning scheme due to the increased interference in the uplink. Equation 2 compensates in time for this difference between the uplink and downlink frequency re-use efficiency by allowing for more uplink time. Thus, the methods and systems described can utilize a combination of a downlink/uplink ratio and an uplink time frame allocation scheme to reduce co-channel interference.

The co-channel interference reducing methods and systems have been described above in the context of a communication re-use scheme having a frequency re-use factor of 2 with 2 frequency sets (A and B) and 4 sectors per cell. The methods and systems disclosed herein are not so limited and can be used with different communication re-use schemes. Examples of such alternative schemes are now described with reference to FIGS. 5a–8.

Re-Use 2, 1 frequency set, 4 sectors

Figure 5A:
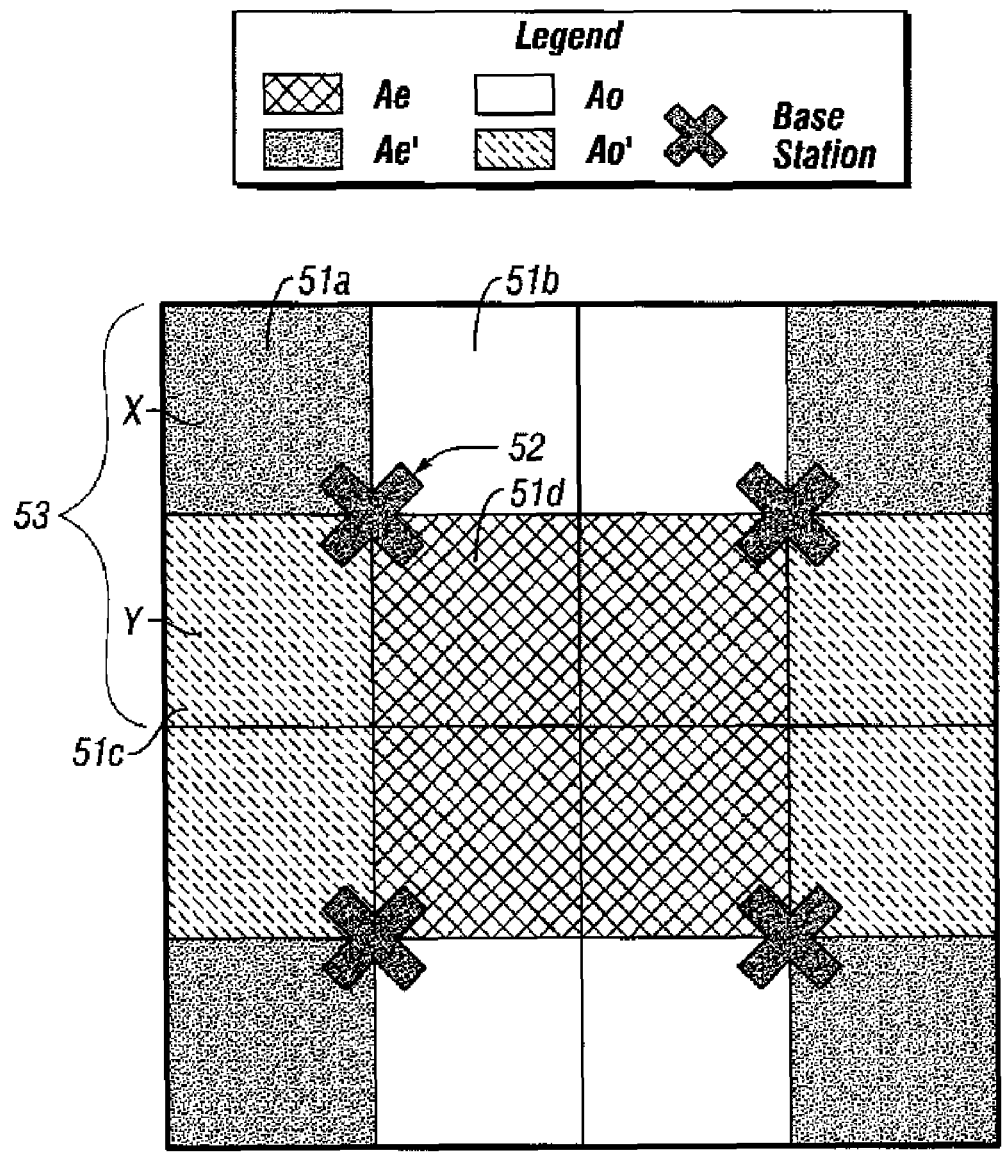
FIG. 5a is a simplified graphical description of a frequency re-use scheme having a frequency re-use factor of 2, 1 frequency set and 4 sectors per cell.

FIG. 5a is a graphical depiction of one embodiment of a frequency reuse having a frequency re-use factor of 2 using only one frequency (one frequency set having two polarizations). A single frequency A is divided on a time frame allocation basis (even and odd frames) and polarized to derive four separate RF channels, Ae (A even), Ae' (A prime even), Ao (A odd), and Ao' (A prime odd). Since only RF channel A is re-used (i.e. as A') within the cell, a re-use factor of 2 is achieved. The RF channels are distributed among 4 sectors 51(a), 51(b), 51(c), 51(d) around a base station 52 in each cell 53. Ae and Ae' are transmitted during even time frames 54. Ao and Ao' are transmitted during odd time frames 55. This embodiment permits frequency re-use while minimizing co-channel interference between adjacent sectors of the cell.

Figure 5B:
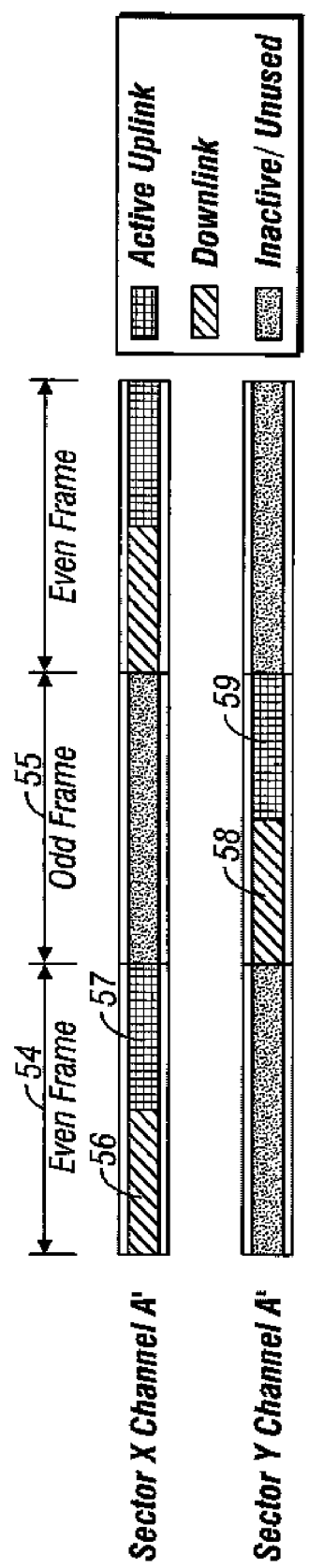
FIG. 5b is an exemplary time frame map representing the uplink and downlink allocation of sectors X and Y.

FIG. 5b shows a time frame map representing the uplink and downlink allocation for sectors X and Y of cell 53. Sector X transmits its uplink on channel Ae'. Sector Y transmits its uplink on channel Ao'. Since terminal stations in sectors X and Y transmit on the same frequency, A', and are located within the line of sight of site of the same base station, the potential exists for an uplink from sector X to interfere with an uplink from sector Y and vice versa. Furthermore, since sectors X and Y both share the same frequency there is also the potential for interference to occur on the downlink from the base station. To minimize co-channel interference, terminal stations in sector X transmit and receive during the even frames 54 and terminal stations in sector Y transmit and receive during the odd time frames 55. Each even frame 54 includes a downlink portion 56 and an uplink portion 57. Each odd frame 55 includes a downlink portion 58 and an uplink portion 59. Sector X is active on the uplink 57 during the even time frames 54 while sector Y is active on the uplink 59 during the odd time frames 55. The communication scheme of FIGS. 5a and 5b can be readily adapted for use with a downlink/uplink ratio and an uplink time frame allocation scheme to reduce co-channel interference.

Re-Use 2, 3 frequency sets, 6 sectors

Figure 6:
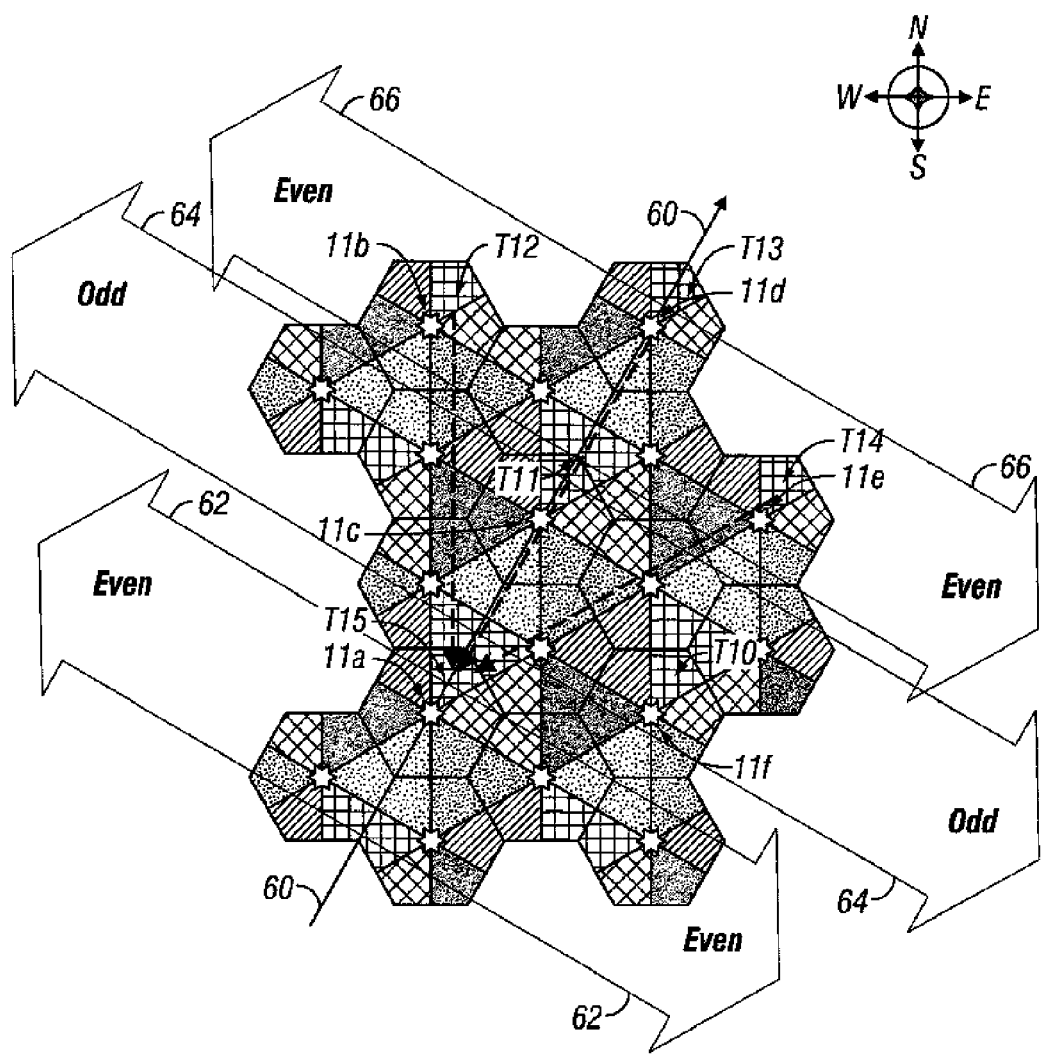
FIG. 6 is a simplified graphical description of a frequency re-use scheme having a frequency re-use factor of 2, 3 frequency sets and 6 sectors per cell.

FIG. 6 is a graphical depiction of another embodiment of a frequency re-use having a frequency re-use factor of 2. This embodiment includes 3 frequency sets (3 different frequencies having 2 polarizations) and 6 sectors per cell. Three frequency sets are polarized to derive 6 distinct RF channels (denoted in FIG. 6 by various different shadings). Sectors having the same shading use the identical frequency and the identical polarization (i.e., sectors having the same shading use identical RF channels). Cells are nominally hexagonally shaped having 6 RF channels per cell.

Base stations 11(a), 11(b), 11(c), 11(d), 11(e) and 11(f) all use identical frequency re-use patterns. Identical re-use patterns are defined herein as cells that use identical RF channels for each similarly geographically located sector within the cell. For example, the cell associated with base station 11(a) uses the same frequency re-use pattern as base station 11(b). Each sector associated with base station 11(a) and 11(b), and facing the same direction with respect to their respective base stations 11 (a) and 11(b), use the same RF channel. For example, sector T15 (extending from base station 11(a) in a northeast direction) uses the same RF channel as does sector T12 (which extends from its associated base station 11(b) in the same direction, northeast). Every other sector in the cells served by base station 11(a) use the same RF channels as do their geographical counterpart sectors served by base station 11(b).

In order to reduce co-channel interference in the uplink, the terminal stations that may potentially cause co-channel interference in the uplink are identified. This includes base stations that use identical frequency re-use patterns and that are sufficiently near the base station of interest as to contribute to co-channel interference. The co-channel interference reducing method and system work on a sector-by-sector basis. That is, only sectors that are sufficiently proximate to a sector of interest, using the same RF channel as the sector of interest, and facing the same direction with respect to their associated base stations as does the sector of interest, are considered. The method is then extended and repeated for every sector in a cell and along the line of sight of each sector of the cell.

For example, the potential uplink interferers with base station 11(a) and its terminal stations located in sector T15 are examined. Sector T15 faces in a northeast direction along directional ray 60. All similarly geographically located sectors that are within sufficiently close proximity to sector T15 to potentially cause co-channel interference on the uplink are considered using the present method. More specifically, sectors are identified as potentially interfering because: (a) they use the same RF channel as does sector T15, (b) they face the same direction with respect to their associated base stations as does T15 (in this case, the direction of directional ray 60, e.g., northeast), and they are sufficiently proximate to sector T15 as to contribute to co-channel interference on the uplink of base station 11(a). Sectors T11, T12, T13 and T14 all meet these criteria. The terminal stations located in these sectors are therefore potential interferers on the uplink with the terminal stations located in sector T15.

Timing groups of potentially interfering sectors are identified depending upon their proximity from the sector of interest, in this case, sector T15. For example, sector T11 is the closest to T15 and is associated with base station 11(c). An equidistant sector (equidistant from sector T15) that also uses the identical RF channel as T15, is T10. T10 is associated with base station 11(f). However, T10 is not in the line of sight of sector T15 along directional ray 60, and therefore would not significantly interfere. Nonetheless, T10 can be logically grouped in the same timing grouping as T11. All other sectors having the same RF channel and along the same diagonal directional ray as indicated by diagonal directional ray 64 are logically grouped together in this first timing grouping.

Owing to the configurations of the sectors with respect to their associated base stations, the diagonal directional rays that define the sector timing groupings are perpendicular to the line of sight of the sector of interest. For example, as shown in FIG. 6, the diagonal directional ray 64 that defines the first sector timing grouping is perpendicular to the line of sight of sector T15 which is illustrated by the directional ray 60.

Base stations 11(b), 11(d) and 11(e) use identical frequency re-use plans as base station 11(a) and can be grouped along a second diagonal directional ray 66. Similar to the first diagonal ray 64, the diagonal ray 66 defines a second sector timing grouping comprising base stations 11(b), 11(d), and 11(e), and sectors T12, T13 and T14, respectively. Note that the diagonal 66 is perpendicular to the ray 60, and necessarily parallel to the diagonal 64. These two diagonals, 64 and 66, are used to control the frame timing of their respective sectors.

In order to reduce the uplink interference that may be caused by the sector T11 (the closest sector to sector T15), terminal stations in the sector T11 are allowed to transmit on the uplink only during frames when those in sector T15 (of base station 11(a)) are inactive. Alternatively, the terminal stations in sector T11 are inactive when T15 is active on the uplink. Assuming a frame based communication system having "odd" and "even" frames, the first set of frames may be referred to as odd frames, and the second set of frames may be referred to as even frames. Therefore, T11 is active in the uplink only during odd frames, and inactive during even frames. T15 is inactive in the uplink during odd frames, and active during even frames. FIG. 6 reflects this timing by referring to diagonal 64 as an "odd" diagonal, and diagonal 62 as an "even" diagonal. Diagonal 66 is also referred to as an "even" diagonal, because it uses the same frame timing as does sector T15. More specifically, sectors T12, T13 and T14 (defined by the even diagonal 66) are all active during even frames, and inactive during odd frames.

In the above example, interference on the uplink from terminal stations in the geographically closest potentially interfering sector T11 is effectively removed during the time frames that the terminal stations in sector T15 are active. The co-channel interference from the other potentially interfering sectors (i.e., T12–T14) is still present, but it is at acceptable levels due to the distance that these sectors are from the sector of interest, T15.

Note that the reuse technique described above can be extended to include every sector in the cell of interest. Using the same approach as described above, a second sector of interest is selected. For example, the sector directly adjacent to T15 and to the west of T15 is selected as the second sector of interest. This sector now faces a second direction with respect to base station 11(a). In this case diagonal ray 60 faces a new direction, i.e., the northwest direction. Consequently, the sector timing group diagonals 62, 64 and 66 are all rotated in a counter-clockwise fashion to point in a southwest to northeast direction. That is, the diagonals 62, 64 and 66 are perpendicular to the now northwest pointing directional ray 60.

The frame timing of the sectors having the same RF channel as the new sector of interest, and defined by the diagonals 62, 64 and 66 for the sectors is the same as described above for the case when T15 was the sector of interest. Consequently, the timing of the potentially interfering sectors are defined by the even diagonals 62, 66 and the odd diagonal 64 in the same manner as described above. Those of ordinary skill in the art shall recognize that this same process can be repeated for every sector for a base station of interest in order to define the frame timing for every sector in the communication system.

Re-Use 3/2, 4 frequency sets, 6 sectors

Figure 7:
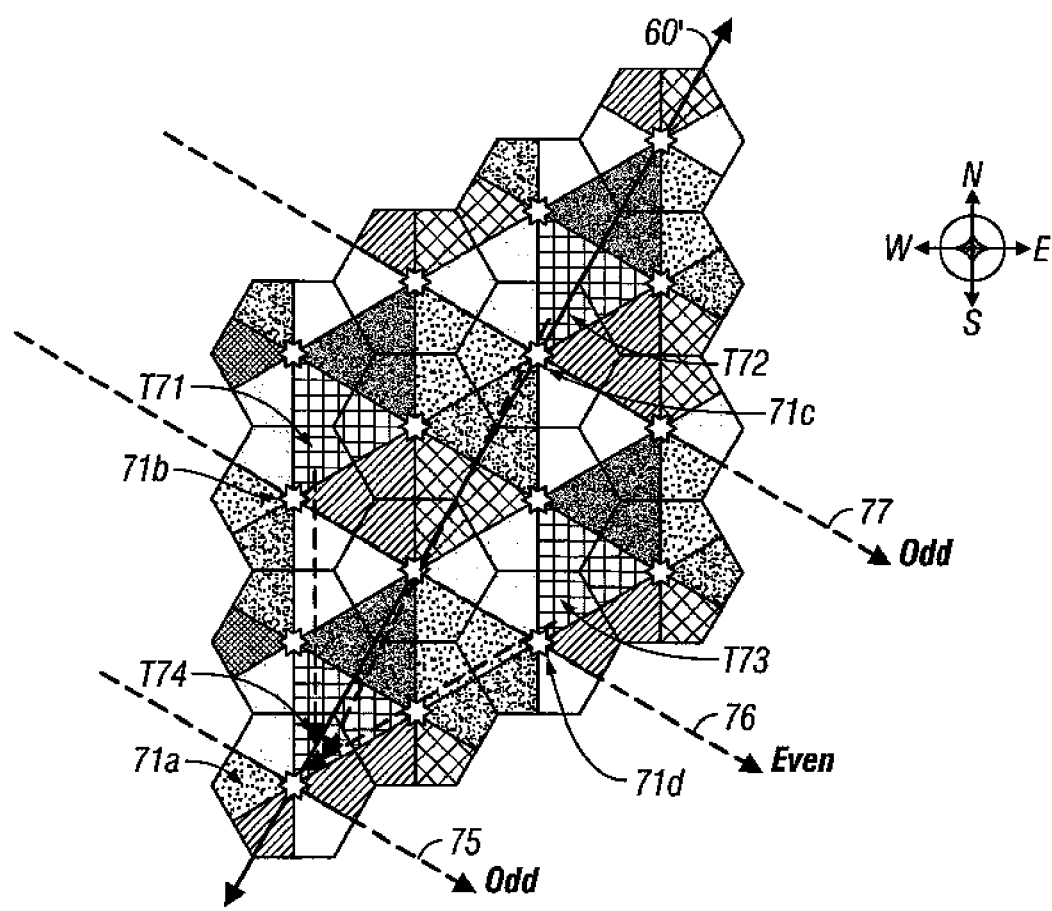
FIG. 7 is a simplified graphical depiction of a frequency re-use scheme showing a frequency re-use factor of 3/2, with 4 available frequency sets and 6 sectors per cell.

FIG. 7 is a graphical depiction of an embodiment of a frequency re-use scheme showing a frequency re-use factor of 3/2. This embodiment includes 4 frequency sets and 6 sectors per cell. Three of the 4 available frequency sets are polarized to derive 6 separate RF channels (denoted by various shadings) per cell because that is all that are needed. Thus, this embodiment includes a total of eight available channels for frequency reuse. Sectors with identical shadings use identical RF channels. Thus, cells corresponding to base stations 71(a), 71(b), 71(c) and 71(d) all have identical frequency re-use plans. The frequency re-use pattern is identical for every sector that extends in the same direction away from their respective base stations. For example, for the sectors extending in a Northeast direction away from the base stations 71(a), 71(b), 71(c) and 71(d), the same frequencies, having the same polarization are used. Thus, as described above, the base stations 71(b), 71(c), and 71(d) communicate with terminal stations located in sectors T71, T72, and T73, respectively, that can potentially interfere on the uplink with terminal stations in sector T74 communicating with the base station 71(a). Similar to the diagonal rays described above with reference to FIG. 6, the base station 71(a) is geographically located on the same diagonal directional ray (indicated by directional ray 60') as is the base station 71(c). Thus, the closest potentially interfering sector to sector T74 is the sector T72. However, as shown in FIG. 7, there are two other potentially interfering sectors, sectors T71 and T73. These sectors face the same direction (with respect to their associated and respective base stations 71(b) and 71(d)) as sector T74 faces with respect to its associated base station 71(a). Furthermore, sectors T71 and T73 are closer in proximity to sector T74 than is sector T72.

Similar to the technique described with reference to FIG. 6, sectors T71 and T73 are assigned to a first sector timing grouping designated by a first diagonal ray 76 labeled as "even." Sector T74 is assigned to a second timing grouping designated by a second diagonal ray 75 labeled as "odd." Sector T72 is also assigned to an "odd" diagonal ray 77, and uses the same timing as used by sector T74. Thus, sectors T74 and T72 are active on the uplink only during odd time frames, and inactive during even time frames. In contrast, sectors T71 and T73 are active on the uplink only during even time frames and inactive during odd time frames. Therefore, any potential co-channel interference that may have been introduced by the terminal stations in sectors T71 and T73 (relative to uplinks from sector T74 to base station 71(a)) is minimized. Potential interference does remain on the uplink from terminal stations in sector T72 during the odd time frames. However, this interference is acceptable because sector T72 is at a significant distance from sector T74. Consequently, co-channel interference on the uplink is reduced, capacity is increased, and less robust modulation schemes may be used. This re-use technique can be extended to include every sector in the cell of interest similarly to extending the re-use scheme described with reference to FIG. 6.

Figure 8:
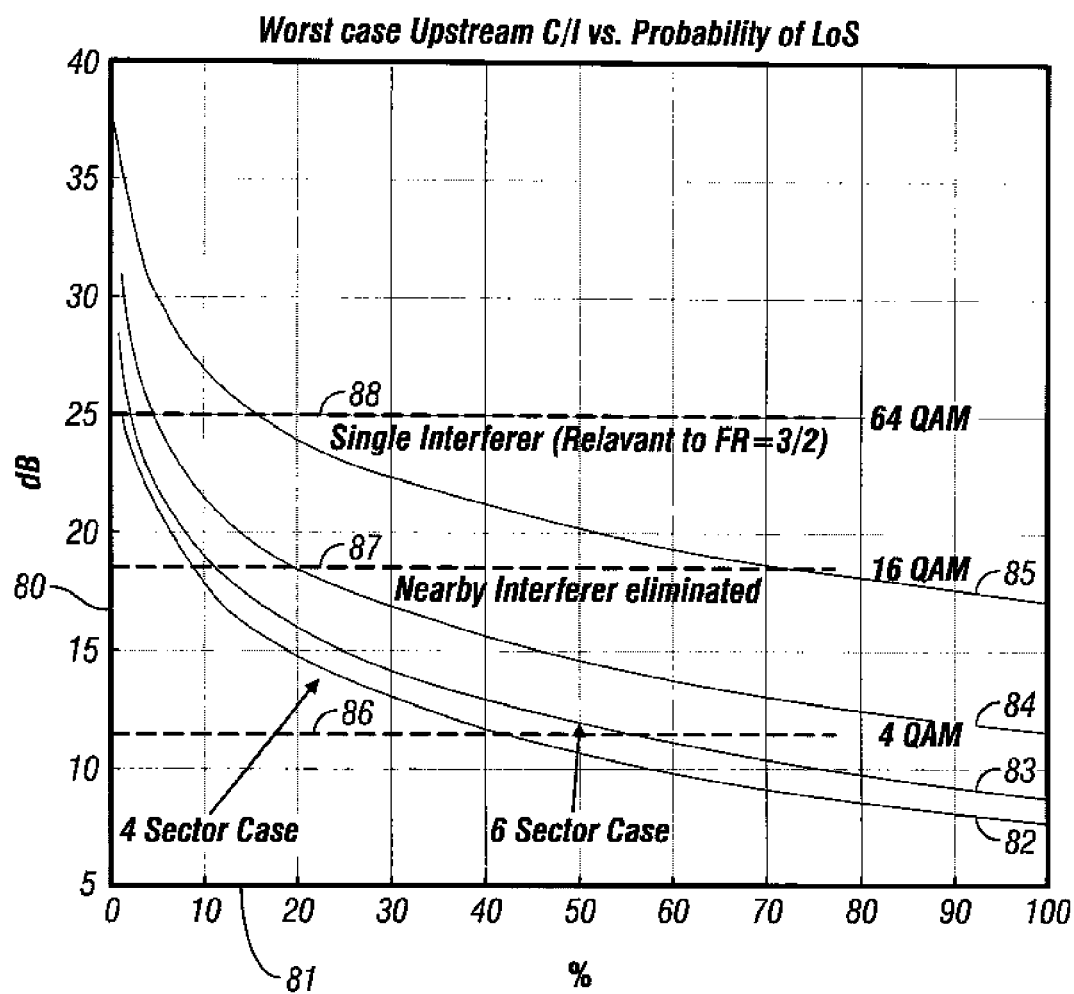
FIG. 8 is a graphical representation of the uplink C/I ratio resulting from the use of various re-use schemes versus the probability of line of sight (LoS) activity of potentially interfering terminal stations.

FIG. 8 is a graph of the uplink C/I ratio resulting from the use of various re-use schemes versus the probability of line of sight (LoS) activity of potentially interfering terminal stations. The vertical axis 80 represents the C/I ratio measured in dB. The horizontal axis 81 represents the probability (measured as a percentage) of a terminal station having a LoS position relative to the desired base station. Co-channel interference is greatest (i.e., worst case scenario occurs) when the probability of LoS is 100 percent. Thus, the C/I ratio reaches its smallest value (i.e., co-channel interference is at its greatest).

Four plot curves are shown that represent the observed C/I when the four re-use schemes described above are used. First, the curve labeled "4 sector case" 82 shows the C/I associated with the 4 sector re-use scheme described with reference to FIG. 1, wherein co-channel interference reduction is not employed. Second, the curve labeled "6 sector case" 83 shows the C/I improvements observed when using the six sector re-use scheme described with reference to FIGS. 6 and 7 without implementing a co-channel interference reduction method. The C/I improvement using the six sector re-use scheme of FIG. 6 with 6 channels, and implementing the co-channel interference reduction scheme, is shown in the curve labeled "Nearby interferer eliminated" 84. Finally, the curve entitled "single interferer (relevant to FR=3/2)" 85 plot line represents the six sector re-use scheme described with reference to FIG. 7 with eight channels and implementing co-channel interference reduction.

Horizontal dashed lines 86, 87, 88 represent examples of minimum C/I levels below which QPSK, QAM-16, and QAM-64 modulation schemes, respectively, do not function properly. For example, a QAM-64 modulation scheme operates properly at a C/I level of 25 dB or greater. A QAM-16 modulation scheme functions properly at a C/I level of 18 dB or greater. And a QPSK modulation scheme functions properly at a C/I level of 11 dB or greater.

The "4 sector case" 82 falls below the QPSK line 86 at a LoS greater than approximately 50%. Similarly, the "6 sector case" 83 falls below the QPSK line 86 at a LoS greater than approximately 55%. Thus, the system capacity of the 4 sector and the 6 sector re-use schemes is greatly reduced since the most robust modulation scheme, QPSK, does not function properly when the C/I falls below 11 dB. However, when the co-channel interference reducing method is utilized with the six sector re-use scheme described with reference to FIG. 6 (represented by the "nearby interferer eliminated" curve 84), the worst case C/I scenario (i.e., 100% LoS) is 11 dB. Thus, the communication system's capacity is not greatly affected because the most robust modulation scheme (i.e., QPSK) can function when the C/I remains 11 dB or above. Furthermore, when the co-channel interference reducing method and system is utilized with the six sector re-use scheme described above with reference to FIG. 7 (represented by the "single interferer" curve 85), the C/I falls below 18 dB at approximately 75% LoS. Thus, a wireless communication system can operate using a QAM-16 modulation scheme whenever the LoS is less than 75%.

The inventive co-channel interference reducing methods and systems have been described above in the context of various communication re-use schemes having various frequency re-use factors, frequency sets and cell sectors (e.g., communication schemes described with reference to FIGS. 3c, 6 and 7). These methods and systems can be used during the deployment or expansion of a communication system in a region. Those of ordinary skill in the art shall recognize that any communication system that operates in a frame based and frame synchronized manner in the uplink, having frame-synchronized base stations, can be used to practice the uplink frequency allocation re-use scheme. Two exemplary time-frame maps (half-duplex FDD and TDD) that can be used in the frame-synchronized systems of FIGS. 3c, 6 and 7 are now described with reference to FIGS. 9a and 9b.

FIG. 9a shows a time frame map 90 for use with the frame-synchronized systems of FIGS. 3c, 6, and 7 on the uplink of an FDD system. In FIG. 9a, base stations located on "even" diagonals 91 (e.g., diagonal ray 32 of FIG. 3c, diagonal rays 62 and 66 of FIG. 6 and diagonal ray 76 of FIG. 7) communicate with associated terminal stations on the uplink (i.e., are active) only during even time frames 92. Base stations located on "odd" diagonals 93 (e.g., diagonal rays 31 and 33 of FIG. 3c, diagonal ray 64 of FIG. 6 and diagonal rays 75 and 77 of FIG. 7) communicate with associated terminal stations on the uplink (i.e., are active) only during odd time frames 94. Therefore, the terminal stations associated with the base stations located on the odd diagonals 93 do not contribute to C/I on the uplink during the even time frames 92. Similarly, the terminal stations associated with the base stations located on the even diagonals 91 do not contribute to C/I on the uplink during the odd time frames 94. Therefore, when the time frame map 90 in the uplink of an FDD system is utilized, interference that may be produced by the terminal stations in nearby sectors does not degrade system performance on the uplink.

FIG. 9b shows a time frame map 95 for use in the frame-synchronized systems of FIGS. 3c, 6, and 7, showing the time frame map in the uplink and downlink of a TDD system. As shown in FIG. 9b, base stations located on "even" diagonals 96 (e.g., diagonal ray 32 of FIG. 3c, diagonal rays 62 and 66 of FIG. 6 and diagonal ray 76 of FIG. 7) communicate with associated terminal stations on the uplink (i.e., are active) only during even time frames 97. Base stations located on "odd" diagonals 98 (e.g., diagonal rays 31 and 33 of FIG. 3c, diagonal ray 64 of FIG. 6 and diagonal rays 75 and 77 of FIG. 7) communicate with associated terminal stations on the uplink (i.e., are active) only during odd time frames 99. Therefore, the terminal stations associated with the base stations located on the odd diagonals 98 do not contribute to C/I on the uplink during the even time frames 97. Similarly, the terminal stations associated with the base stations located on the even diagonals 96 do not contribute to C/I on the uplink during the odd time frames 99. Therefore, when the time frame map 95 in the uplink of a TDD system is utilized, interference that may be produced by the terminal stations in nearby sectors does not degrade system performance on the uplink. Advantageously, in utilizing the time frame map 95, the downlink of the TDD system is unaffected. As described above, due to system capabilities, the downlink is more robust (i.e., receives less interference) than the uplink and, thus, has a higher capacity.

Figure 10:
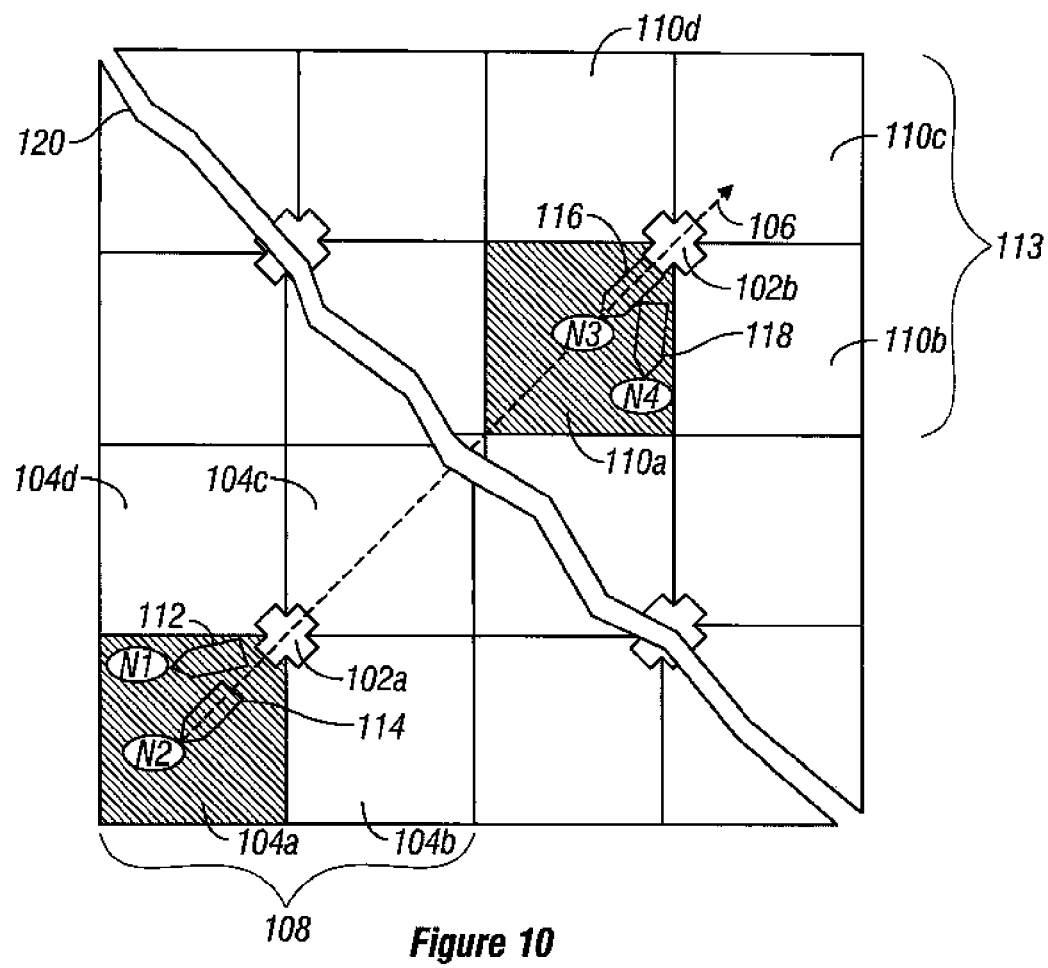
FIG. 10 is a diagram of a wireless communication system that further incorporates the ability to coordinate uplink transmissions from individual terminal stations of different cells to minimize channel interference.

FIG. 10 is a diagram of a wireless communication system, similar to the system described with reference to FIG. 1A, that further incorporates the ability to coordinate uplink transmissions from individual terminal stations of different cells to minimize channel interference. In the system shown in FIG. 10, base station 102a communicates with terminal stations N1 and N2, both of which are located within a sector 104a. For convenience, two terminal stations are shown located within sector 104a. However, additional terminal stations may be located within sector 104a. A cluster of four sectors 104(*a*)–(*d*) surrounds base station 102a to form a cell 108. Terminal station N1 is located close to base station 102a and transmits its uplink along a path 112 with a high signal to noise ratio ("SNR"). Besides distance, SNR can be affected by environmental factors, for example, the weather and local geography. A high SNR permits N1 to transmit using a less robust modulation technique, for example, QAM-64. N1 transmits its uplink using a nominal power level since its uplink achieves a high SNR. N2 is located farther away from the base station 102a and the SNR for its uplink transmission is lower than the SNR for N1. N2 transmits along a path 114 with a more robust modulation technique, for example, QAM-16. N2 transmits using a higher power level than N1 since its uplink has a lower SNR. N2 transmits along a line of sight 106 towards the upper right corner of FIG. 10.

Base station 102b communicates with terminal stations N3 and N4, both of which are located within a sector 110a. For convenience, two terminal stations are shown located within the sector 110a. However, additional terminal stations may be located within the sector 110a. A cluster of four sectors 110(*a*)–(*d*) surrounds base station 102b to form a cell 113. Terminal station N3 is located close to base station 102b and transmits its uplink along a path 116 with a high SNR. A high SNR permits N3 to use a less robust modulation technique, for example, QAM-64. N3 transmits its uplink using a nominal power level since its uplink achieves a high SNR. N4 is located farther away from base station 102b and its SNR is lower than the SNR for N3. N4 transmits along a path 118 with a more robust modulation technique, for example, QPSK. N4 transmits using a higher power level than N3 since its uplink has a lower SNR.

Due to frequency re-use, terminal stations within the sector 104a and the sector 110a transmit their uplinks using the same frequency and polarization. Thus, co-channel interference can occur due to either of the uplinks from terminal stations N1 or N2, located in sector 104a, reaching the base station 102b at the same time that the base station 102b is receiving an uplink from terminal stations N3 or N4 in sector 110a.

Alternatively, the systems and methods described with reference to FIG. 10 can be used to minimize adjacent channel interference. Adjacent channel interference can occur due to a terminal station or base station receiving unwanted RF energy on a channel that is adjacent to its selected channel. For example, adjacent channel interference could occur if sector 104a was assigned to a horizontal polarization of a channel and sector 110a was assigned to a vertical polarization of the same channel. Thus, in this example, adjacent channel interference can occur due to either of the uplinks from terminal stations N1 or N2, located in sector 104a, reaching the base station 102b at the same time that the base station 102b is receiving an uplink from terminal stations N3 or N4 in sector 110a. For ease of description, the following text applies the systems and methods of FIG. 10 in the context of minimizing co-channel interference. However, as explained above, these systems and methods can also be used to minimize adjacent channel interference.

Base station 102b is located along the line off sight 106. For convenience, base station 102b is shown as the next adjacent base station along the line of sight 106 from base station 102a. Alternatively, as illustrated by dividing line 120, base station 102b can be located such that single or multiple cells are located between base station 102a and base station 102b.

Base station 102a coordinates the uplink transmissions from terminal stations N1 and N2. Base station 102b coordinates the uplink transmissions from terminal station N3 and N4. Base station 102a and base station 102b together coordinate uplink transmissions from their terminal stations in sectors 104a and 110a to minimize co-channel interference from their respective terminals. Alternatively, this coordination can be performed by a network management system (not shown). For example, the uplink transmission path 112 from terminal station N1 to base station 102a is not along line of sight 106. The SNR, measured at base station 102b, for an uplink transmission from N1 are low such that it will have minimal interference with simultaneous transmissions from N3 or N4. The terminal stations N3 and N4 within sector 110a can transmit their uplinks using a less robust modulation technique since N1 will not cause co-channel interference.

The uplink transmission path 114 from terminal station N2 to base station 102a is along line of sight 106 which passes through base station 102b. The SNR, measured at base station 102b, for an uplink transmission from N2 is high such that it may interfere with a simultaneous uplink transmission from N3 or N4. To reduce the potential for co-channel interference occurring at base station 102b, base station 102a and base station 102b coordinate the uplink transmission of N2 with the uplink transmissions from terminal stations N3 and N4 in sector 110a. This coordination can limit the modulation techniques available for uplink transmissions from terminal stations N3 and N4 in sector 110a to more robust modulation techniques, for example, QPSK and QAM-16. For example, if N3's preferred modulation, absent interference from N2, is QAM-64, N3 uplinks to base station 102b using QAM-16 when N2 is transmitting its uplink to base station 102a. Alternatively, N3 could consistently use QAM-16 for simplicity. Since terminal station N4's preferred modulation, absent interference from N2, is a more robust technique, i.e. QPSK, N4 does not change its modulation technique to a more robust technique when N2 is transmitting its uplink. Thus, while terminal station N2 is transmitting, the terminal stations N3 and N4 in sector 110a modulate their uplink transmissions using a more robust modulation technique to minimize the effect of co-channel interference at base station 102b.

Alternatively, uplink transmissions from terminal stations in sector 110a which may be susceptible to co-channel interference from N2's uplink can be fixed to not occur while N2 is transmitting. For example, N3, which has a less robust preferred modulation technique, would not uplink to base station 102a while N2 is uplinking to base station 102b. Alternatively, N2's uplink transmission can be halted when terminal stations in sector 110a are transmitting their uplinks. For example, if N3 and N4 were using a less robust modulation technique for their uplinks, N2, which uplinks with high power along line of sight 106, would not uplink to base station 102a while terminal stations N3 or N4 are uplinking to base station 102b. Alternatively, forward error correction techniques can be substituted for or used in conjunction with the process described above. For example, forward error correction data can be transmitted with the data in the uplink from terminal station N3 in sector 110a to increase the robustness of its preferred modulation technique, QAM-64.

Selecting the specific modulation technique for uplink data from terminal stations N1 and N2 in sector 110a can be based upon a measured SNR for N2's received signal at base station 102b. Alternatively, the geometric locations of the terminal stations N1 and N2 within sector 104a can be used to determine the likelihood of co-channel interference occurring at base station 102b. For example, the location and uplink path of a terminal station is determined with respect to a base station where co-channel interference may occur. A GPS can be used to determine a terminal station's location and uplink path. Once determined, potentially interfering terminal stations are identified for uplink coordination by its associated base station and the base station where the interference may occur.

Figure 11:
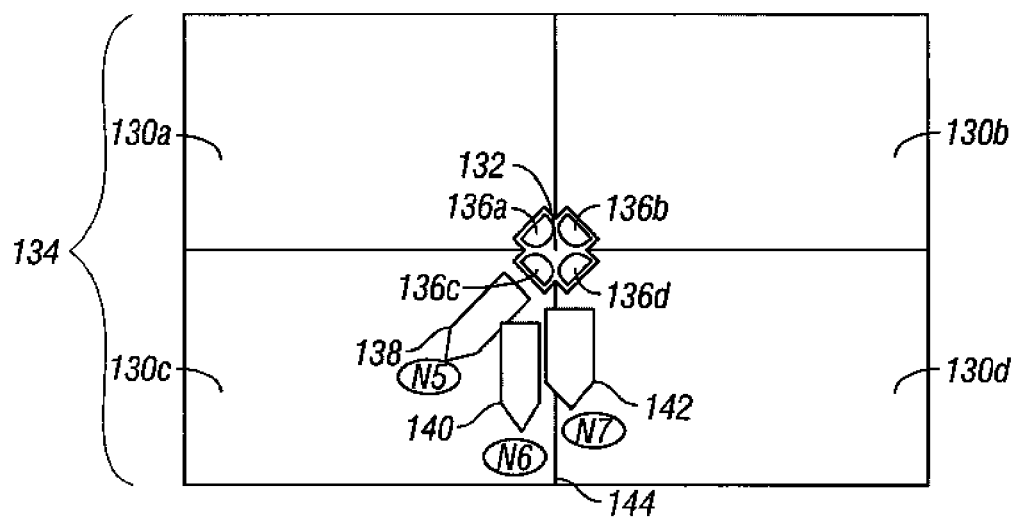
FIG. 11 is a diagram of a cell of a wireless communication system that incorporates the ability to coordinate uplink transmissions from individual terminal stations in the same cell to minimize adjacent channel interference.

FIG. 11 is a diagram of a cell of a wireless communication system that incorporates the ability to coordinate uplink transmissions from individual terminal stations in the same cell to minimize adjacent channel interference. A cluster of four sectors 130(a)–(d) surrounds base station 132 to form cell 134. Base station 132 communicates with terminal stations N5, N6, N7 located within cell 134. For ease of description, three terminal stations are shown within cell 134. Additional terminal sectors within cell 134 can also be used. Moreover, the locations of additional terminal sectors within sectors 130(a)–(d) can be varied.

Base station 132 includes an array of sectored antennas 136(a)–(d) for communicating with the terminal stations within cell 134. A sectored antenna is often 60 or 90 degrees in beamwidth for communicating with the terminal stations within an entire sector. Thus, in a four-sector case, base station 132 comprises at least four sectored antennas, with at least one antenna per sector 130a, 130b, 130c, 130d. Sector 130c and sector 130d are separated by line 144. Terminal stations located on opposite sides of line 144 are associated with different base station antenna. Sectored antenna 136a is used to transmit and receive with terminal stations located within sector 130a. Sectored antenna 136b is used to transmit and receive with terminal stations located within sector 130b. Sectored antenna 136c is used to transmit and receive with terminal stations located within sector 130c. Sectored antenna 136d is used to transmit and receive with terminal stations located within sector 130d.

Terminal station N5 is located within sector 130c and uplinks along path 138 to antenna 136c. Terminal station N5 is located close to base station 132 and transmits its uplink with a high SNR measured at antenna 136c. A high SNR permits N5 to transmit using a less robust modulation technique, for example, QAM-64. N5 transmits its uplink using a nominal power level since its uplink achieves a high SNR. N6 is located in sector 130c. N6 is located farther away from base station 132 than N5 and is also near line 144. The SNR for its uplink transmission measured at antenna 136c is lower than the SNR for N5. N6 transmits along path 140 with a more robust modulation technique, for example, QAM-16. N6 transmits using a higher power level than N5 since its uplink has a lower SNR.

Base station 132 communicates with terminal station N7 within sector 130d. Terminal station N7 is located close to base station 132 and near line 144. N7 transmits its uplink along path 142 with a high SNR measured at antenna 136d. N7 transmits its uplink using a nominal power level since its uplink achieves a high SNR. The terminal stations within sector 130c use a first channel to uplink to base station 132. The terminal stations within sector 130d use a second channel, which is adjacent to the first channel, to transmit their uplinks to base station 132. Since N7 transmits with a high SNR along line 144, its uplink can cause adjacent channel interference at antenna 136c with the uplinks from terminal stations N5 and N6 in sector 130c. Thus, adjacent channel interference can occur due to the uplink from terminal station N7, located in sector 130d, reaching antenna 136c at the same time that base station 132 is receiving uplink transmissions from terminal stations N5 and N6 in sector 130c.

Base station 132 coordinates the uplink transmissions from terminal stations N5, N6, and N7 to minimize adjacent channel interference. For example, the uplink transmission path 142 from terminal station N7 to base station 132 is adjacent to line 144. Even though the uplink from terminal station N7 will potentially cause interference with the uplink from N5, adjacent channel interference may not occur. The uplink from terminal station N5 is received at antenna 136c with a high SNR. The SNR, measured at antenna 136c, of an uplink transmission from N7 is low. Thus, the base station 132 is able to differentiate between the potentially interfering signal from N7 and the high SNR signal from N5 if they are received simultaneously by antenna 136c.

In contrast, the uplink transmission from N6 has a lower SNR than the uplink from N5. Thus, the SNR of the uplink from N6 is closer to the SNR of the uplink from N7. Adjacent channel interference is more likely to occur at antenna 136c due to the uplink from N7 interfering with the uplink from N6. In this case, to reduce the potential for adjacent channel interference occurring at antenna 136c, base station 132 coordinates the uplink transmission of N6 in sector 130c with the uplink transmission from terminal station N7 in sector 130d. This coordination can limit the modulation techniques available for uplink transmissions from terminal station N6 to more robust modulation techniques, for example, QPSK and QAM-16. For example, if N6's preferred modulation absent interference from N7 is QAM-16, N6 uplinks to base station 132 using QPSK when N7 is transmitting its uplink to base station 132. Alternatively, N6 could consistently use QPSK for simplicity. Thus, while terminal station N7 is transmitting, terminal station N6 modulates its uplink transmissions using a more robust modulation technique to minimize the effect of adjacent channel interference occurring at antenna 136c of base station 132.

Alternatively, uplinks from terminal station N7 in sector 130d can be fixed to not occur while N6 is transmitting its uplink to the base station 132. For example, N7, which transmits its uplink with high power adjacent to line 144 would not uplink to the base station 132 while N6 is uplinking to the antenna 136a of the base station 132. Alternatively, N6's uplink transmission can be halted while terminal station N7 is transmitting its uplink. For example, if N6 was using a less robust modulation technique for its uplink, N7, which uplinks with high power adjacent to line 144, would not uplink to the base station while terminal station N6 is uplinking to the base station 132. Alternatively, forward error correction techniques can be substituted for or used in conjunction with the process described above. For example, forward error correction data can be transmitted with the data in the uplink from terminal station N6 in sector 130c to increase the robustness of its preferred modulation technique, QAM-16.

Selecting the specific modulation technique for uplink data from terminal station N6 in sector 130c can be based upon a measured SNR of N7's received signal at antenna 136c of base station 132. Alternatively, the geometric location of terminal station N7 within sector 130d is used to determine the likelihood of adjacent channel interference occurring at antenna 136c of base station 132. Once determined, potentially interfering terminal stations in an adjacent sector of a cell are identified for uplink coordination by the cell's base station.

Various aspects and a number of embodiments of the present invention have been described. Nevertheless, it will be understood that various modifications may be made without departing from the spirit and scope of the invention. For example, different numbers of sectors of cells can be used. In addition, multi-point to point links can be used. This is equivalent to using a plurality of narrow beam sectored antennas at the base station. Accordingly, it is to be understood that the invention is not to be limited by the specific illustrated embodiment, but only by the scope of the appended claims.

What is claimed is:

1. A method of reducing co-channel interference in a communication system having base stations and terminal stations with each terminal station associated with one base station sector, each base station has an associated and corresponding cell, each cell includes a plurality of associated and corresponding sectors, each sector of each cell having a different channel than the other sectors of the same cell, the communication system comprises an uplink and a downlink with each including at least one slot, and the uplink comprises an uplink signal divided in the frequency domain into a plurality of channels, the method comprising:
   determining a set of terminal stations that may potentially interfere with each other at a selected base station sector if they use the same channel;
   determining a first subset of the set of terminal stations such that the subset communicates with a first set of associated and corresponding base station sectors that are arranged along a first line of sight that includes the selected base station;
   determining a second subset of the set of terminal stations, wherein the subset communicates with a second set of associated and corresponding base station sectors that are arranged along a second line of sight which is parallel with the first line of sight;
   allocating a first up link channel for the first subset of terminal stations; and
   allocating a second uplink channel for the second subset of terminal stations.

2. The method of claim 1, further comprising transmitting on said first uplink channel from the terminal stations associated with the first set of base stations and transmitting on said second uplink channel from the terminal stations associated with the second set of base stations.

3. The method of claim 1, further comprising separating the uplink and downlink into frames for use in a time division duplex communication system.

4. The method of claim 1, further comprising using a first frequency for the uplink and a second frequency for the downlink, both for use in a frequency division duplex communication system.

5. The method of claim 1, wherein the method is used with a single frequency set and four sectors per cell.

6. The method of claim 1, further comprising separating the first uplink channel into a first polarization upper sub-channel, a second polarization upper sub-channel, a first polarization lower sub-channel, and a second polarization lower sub-channel, all of which are used within a four sector cell.

7. The method of claim 1, further comprising separating the second uplink channel into a first polarization upper sub-channel, a second polarization upper sub-channel, a first polarization lower sub-channel, and a second polarization lower sub-channel, all of which are used within a four sector cell.

8. The method of claim 1, further comprising adjusting the number of the at least one slots in the downlink to compensate for differences in spectrum efficiency of the downlink as compared to the uplink.

9. The method of claim 8, further comprising calculating the number of the at least one slot in the downlink using equation $Rd=1/[(Sd/Su)/(Td/Tu)+1]$, wherein $Sd$=spectrum efficiency for the downlink, $Su$=spectrum efficiency for the uplink, $Td$=time slots allocated by the system on the downlink, and $Tu$=time slots allocated by the system on the uplink.

10. The method of claim 9, further comprising calculating the number of the at least one slot in the uplink using the equation $Ru=1-Rd$.

11. A communication system with reduced co-channel interference for use in a communication system having base stations and terminal stations, the system comprising:
a set of terminal stations that may potentially interfere with each other at a selected base station sector, each terminal station being associated with at least one base station sector, each base station having an associated and corresponding cell which includes a plurality of associated and corresponding sectors, each sector of each cell having a different channel than the other sectors of the same cell, wherein the communication system comprises an uplink and a downlink, the uplink comprising an uplink signal divided in the frequency domain into a first uplink channel and a second uplink channel;
a first set of base station sectors associated with a first subset of the set of terminal stations and are arranged along a first line of sight which includes the selected base station sectors; and
a second set of base station sectors associated with a second subset of the set of terminal stations and are located along a second line of sight which is parallel to the first line of sight, the terminal stations associated with the first set of base station sectors are configured to transmit on the first uplink channel and the terminal stations associated with the second set of base station sectors are configured to transmit on the second uplink channel.

12. The system of claim 11, wherein the first uplink channel includes a first polarization upper sub-channel, a second polarization upper sub-channel, a first polarization lower sub-channel, and a second polarization lower sub-channel, all for use in a four sector cell.

13. The system of claim 11, wherein the second uplink channel includes a first polarization upper sub-channel, a second polarization upper sub-channel, a first polarization lower sub-channel, and a second polarization lower sub-channel, all for use in a four sector cell.

14. The system of claim 11, wherein the uplink and downlink are separated into frames in the time domain to operate in a time division duplex manner.

15. The system of claim 11, wherein the uplink and downlink are separated in the frequency domain to operate in a frequency division duplex manner.

16. A system for reducing co-channel interference that includes base stations and terminal stations where each terminal station is associated with a base station and where the base stations and the terminal stations communicate during a first frame and a second frame of an uplink channel, the system comprising:
a selected base station that is susceptible to receiving co-channel interference from a set of terminal stations and is configured to receive the uplink channel at a first frequency and to transmit a downlink channel at a second frequency;
a first subset of the set of terminal stations, wherein the first subset comprises at least two terminal stations, the first subset of terminals that lie along a geographical diagonal line of sight passing through the selected base station; and
a second subset of the set of terminal stations, wherein the second subset comprises at least two terminal stations, the second subset of terminals lie outside the geographical diagonal line of sight, wherein the first subset of the set of terminal stations is configured to transmit at the first frequency to an associated first set of base stations during the first frame of an uplink channel and wherein the second subset of the set of terminal stations is configured to transmit at the first frequency to an associated second set of base stations during the second frame of the uplink channel.

17. The system of claim 16, wherein the first set of base stations lie along the geographic diagonal line.

18. The system of claim 16, wherein the system is configured to operate in a frequency division duplex communication system.

19. A method for reducing co-channel interference in a communication system that includes base stations and terminal stations where each base station has an associated cell, each cell includes a plurality of sectors, and each sector of each cell uses a different uplink channel than the other sectors of the same cell, each terminal station is associated with a base station and with a sector of its associated base station, and an uplink signal is divided in the frequency domain into a first uplink channel and a second uplink channel, the method comprising:
determining a set of terminal stations that may potentially interfere with each other at a selected base station sector;
determining a first subset of the set of terminal stations, wherein the first subset comprises at least two terminal stations, the first subset of terminals having a first set of associated and corresponding base station sectors which lie along a geographical diagonal line of sight passing trough the selected base station;
determining a second subset of the set of terminal stations, wherein the second subset comprises at least two terminal stations, the second subset of terminals having a second set of associated and corresponding base station sectors that lie outside the geographical diagonal line of sight;

allocating the first uplink channel for the first subset of terminal stations to communicate with their associated base station sectors; and allocating the second uplink channel for the second subset of terminal stations to communicate with their associated base station sectors.

20. The method of claim 19, further comprising transmitting on the first uplink channel by the first set of terminal stations to their associated base stations and transmitting on the second uplink channel by the second set of terminal stations to their associated base stations.

21. The method of claim 19, further comprising separating the uplink and downlink into frames for use in a time division duplex communication system.

22. The method of claim 19, further comprising using a first frequency for the uplink and a second frequency for the downlink, both for use in a frequency division duplex communication system.

23. A method for reducing channel interference in a communication system that includes base stations and terminal stations with each terminal station associated with a base station, and each base station is associated with a cell, the method comprising:

determining a first set of terminal stations in a first cell that may potentially interfere with a second set of terminal stations in a second cell;

determining a subset of the first set of terminal stations, wherein said subset comprises at least two terminal stations, that lie along a line of sight that passes trough a base station in the second cell;

determining a subset of the second set of terminal stations that uplink using a less robust modulation technique than is available;

selecting a more robust modulation technique for the subset of the second set of terminal stations; and coordinating uplink transmissions by the subset of the first set of terminal stations with uplink transmissions by the subset of the second set of terminal stations so that the subset of the second set of terminal stations utilize the more robust modulation technique when terminals in the subset of the first set of terminal stations are transmitting to decrease the effect of channel interference at the base station in the second cell.

24. The method of claim 23, wherein the first set of terminal stations and the second set of terminal stations both uplink using a first channel.

25. The method of claim 23, wherein the first set of terminal stations uplink using a first channel and the second set of terminal stations uplink using a second channel, such that the first and second channels are adjacent channels.

26. The method of claim 23, further comprising measuring signal to noise ratios at the base station in the second cell for the uplink transmissions from the first set of terminal stations to determine the first subset of the first set of terminal stations.

27. A method for reducing channel interference in a communication system that includes base stations and terminal stations, each base station is associated with a cell, each cell includes a plurality of sectors, each terminal station is associated with a base station and with a sector of its associated base station, the method comprising:

determining a first set of terminal stations in a sector of a first cell that may potentially interfere with a second set of terminal stations in a sector of a second cell;

determining a subset of the first set of terminal stations, wherein said subset comprises at least two terminal station, that lie along a line of sight that passes through a base station in the second cell;

determining a subset of the second set of terminal stations that uplink using a less robust forward error correction technique than is available;

selecting a more robust forward error correction technique for the subset of the second set of terminal stations when terminal stations in the subset of first terminal stations are transmitting; and coordinating uplink transmissions by the subset of the first set of terminal stations with uplink transmissions by the subset of the second set of terminal stations, the subset of the second set of terminal stations utilizing the more robust forward error correction technique to reduce channel interference at the base station in the second cell.

28. The method of claim 27, wherein the first set of terminal stations and the second set of terminal stations both uplink using a first channel.

29. The method of claim 27, wherein the first set of terminal stations uplink using a first channel and the second set of terminal stations uplink using a second channel, such that the first and second channels are adjacent channels.

30. The method of claim 27, further comprising measuring signal to noise ratios at the base station in the second cell for the uplink transmissions from the first set of terminal stations to determine the first subset of the first set of terminal stations.

31. A system for reducing channel interference in a communication system that includes base stations and terminal stations with each terminal station associated with a base station, and each base station is associated with a cell, the system comprising:

a first set of terminal stations located in a first cell that may potentially interfere with a second set of terminal stations in a second cell;

a subset of the first set of terminal stations, wherein said subset comprises at least two terminal station, that lie along a line of sight that passes through a base station in the second cell; and a subset of the second set of terminal stations that are configured to select a more robust modulation technique for their uplink transmissions, wherein the uplink transmissions by the subset of the first set of terminal stations are coordinated with uplink transmissions by the second set of terminal stations, the second set of terminal stations utilizing the more robust modulation technique when the first subset of the first set of terminal stations are transmitting to reduce channel interference at the base station in the second cell.

32. The system of claim 31, wherein the first set of terminal stations and the second set of terminal stations both uplink using a first channel.

33. The system of claim 31, wherein the first set of terminal stations uplink using a first channel and the second set of terminal stations uplink using a second channel, such that the first and second channels are adjacent channels.

34. The system of claim 31, wherein the base station in the second cell is configured to measure signal to noise ratios for uplink transmissions from the first set of terminal stations to determine the subset of the first set of terminal stations.

35. A system for reducing channel interference in a communication system that includes base stations and terminal stations with each terminal station associated with a base station, and each base station is associated with a cell, the system comprising:
- a first set of terminal stations located in a first cell that may potentially interfere with a second set of terminal stations in a second cell; and
- a subset of the first set of terminal stations, wherein said subset comprises at least two terminal station, that lie along a line of sight that passes through a base station in the second cell, where the second set of terminal stations that are configured to select a more robust forward error correction technique for their uplink transmissions, when terminal stations in the subset of first set of terminal stations is transmitting, wherein the uplink transmissions by the subset of the first set of terminal stations are coordinated with uplink transmissions by the second set of terminal stations, the second set of terminal stations utilizing the more robust forward error correction technique to reduce channel interference at the base station in the second cell.

36. The system of claim 35, wherein the first set of terminal stations and the second set of terminal stations both uplink using a first channel.

37. The system of claim 35, wherein the first set of terminal stations uplink using a first channel and the second set of terminal stations uplink using a second channel, such that the first and second channels are adjacent channels.

38. The system of claim 35, wherein the base station in the second cell is configured to measure signal to noise ratios for uplink transmissions from the first set of terminal stations to determine the subset of the first set of terminal stations.

39. A method for reducing adjacent channel interference in a communication system that includes a base station and terminal stations with each base station having antenna arrays, and each terminal station associated with one antenna array for transmitting an uplink to the base station, the method comprising:
- determining a first set of terminal stations that may potentially interfere with a second set of terminal stations, the first set of terminal stations being associated with a first antenna array and the second set of terminal stations being associated with a second antenna;
- determining a subset of the first set of terminal stations, wherein said subset comprises at least two terminal stations, that lie along a line of sight that passes through the second antenna
- determining a subset of the second set of terminal stations that uplink to the second antenna array using a less robust modulation technique than is available;
- selecting a more robust modulation technique for the subset of the second set of terminal stations when terminal stations in the first set of terminal stations are transmitting; and
- coordinating uplink transmissions by the first set of terminal stations with uplink transmissions by the subset of the second set of terminal stations, the subset of the second set of terminal stations utilize the more robust modulation technique for their uplink transmissions to reduce adjacent channel interference at the second antenna array.

40. The method of claim 39, wherein the first set of terminal stations uplink using a first channel and the second set of terminal stations uplink using a second channel, such that the first and second channels are adjacent channels.

41. The method of claim 39, further comprising measuring signal to noise ratios at the first antenna array for the uplink transmissions from the first set of terminal stations to determine the potential for interfering with the second set of terminal stations.

42. A method for reducing adjacent channel interference in a communication system that includes base stations and terminal stations with each base station having antenna arrays, and each terminal station associated with one antenna array for transmitting an uplink to a base station, the method comprising:
- determining a first set of terminal stations that may potentially interfere with a second set of terminal stations, the first set of terminals being associated with a first antenna array and the second set of terminal stations being associated with a second antenna array;
- determining a subset of the first set of terminal stations, wherein said subset comprises at least two terminal stations, that lie along a line of sight that passes through the second antenna array
- determining a subset of the second set of terminal stations that uplink to the second antenna array using a less robust forward error correction technique than is available;
- selecting a more robust forward error correction technique for the subset of the second set of terminal stations when terminal stations in the first set of terminal stations are transmitting; and
- coordinating uplink transmissions by the first set of terminal stations with uplink transmissions by the subset of the second set of terminal stations, the subset of the second set of terminal stations utilize the more robust forward error correction technique for their uplink transmissions to reduce adjacent channel interference at the second antenna array.

43. The method of claim 42, wherein the first set of terminal stations uplink using a first channel and the second set of terminal stations uplink using a second channel, such that the first and second channels are adjacent channels.

44. The method of claim 42, further comprising measuring signal to noise ratios at the first antenna array for the uplink transmissions from the first set of terminal stations to determine the potential for interfering with the second set of terminal stations.

45. A system for reducing adjacent channel interference in a communication system that includes a base station and terminal stations with each base station having antenna arrays, and each terminal station associated with one antenna array for transmitting an uplink to the base station, the system comprising:
- a first set of terminal stations associated with a first antenna array that may potentially interfere with a second set of terminal stations associated with a second antenna array, the first set of terminal stations having a subset, wherein said subset comprises at least two terminal stations, that lie along a line of sight that passes through the second antenna array, the second set of terminal stations are configured to select a more robust modulation technique for their uplink transmissions when terminal stations in the first set of terminal stations are transmitting, wherein the uplink transmissions by the first set of terminal stations are coordinated with uplink transmissions by the second set of terminal stations, the second set of terminal stations utilizing the more robust modulation technique to reduce adjacent channel interference at the second antenna array.

46. The system of claim 45, wherein the first set of terminal stations uplink using a first channel and the second set of terminal stations uplink using a second channel, such that the first and second channels are adjacent channels.

47. The system of claim 45, wherein the base station is configured to measure signal to noise ratios for uplink transmissions from the first set of terminal stations which are used to determine the potential for the first set of terminal stations to interfere with the second set of terminal stations.

48. A system for reducing adjacent channel interference in a communication system that includes base stations and terminal stations with each base station having antenna arrays, and each terminal station associated with one antenna array for transmitting an up link to a base station, the system comprising:
  a first set of terminal stations associated with a first antenna array that may potentially interfere with a second set of terminal stations associated with a second antenna array, the first set of terminal stations having a subset, wherein said subset comprises at least two terminal stations, that lie along a line of sight that passes through the second antenna array, wherein the second set of terminal stations are configured to select a more robust forward error correction technique for their uplink transmissions when terminal stations in the first set of terminal stations transmit, wherein the uplink transmissions by the first set of terminal stations are coordinated with uplink transmissions by the second set of terminal stations, the second set of terminal stations utilizing the more robust forward error correction technique to reduce adjacent channel interference at the second antenna array.

49. The system of claim 48, wherein the first set of terminal stations uplink using a first channel and the second set of terminal stations uplink using a second channel, such that the first and second channels are adjacent channels.

50. The system of claim 48, wherein the base station is configured to measure signal to noise ratios for uplink transmissions from the first set of terminal stations which are used to determine the potential for the first set of terminal stations to interfere with the second set of terminal stations.

* * * * *